United States Patent [19]
Ezawa

[11] Patent Number: 5,463,435
[45] Date of Patent: Oct. 31, 1995

[54] CAMERA

[75] Inventor: Akira Ezawa, Shin, Japan

[73] Assignee: Nikon Corporation, Tokyo, Japan

[21] Appl. No.: 384,453

[22] Filed: Feb. 3, 1995

Related U.S. Application Data

[63] Continuation of Ser. No. 209,368, Mar. 14, 1994, abandoned, which is a continuation of Ser. No. 112,479, Aug. 27, 1993, abandoned, which is a continuation of Ser. No. 730,070, Jul. 15, 1991, abandoned, which is a continuation-in-part of Ser. No. 652,135, Feb. 7, 1991, abandoned, and a continuation-in-part of Ser. No. 728,208, Jul. 10, 1991, abandoned, which is a continuation-in-part of Ser. No. 652,135, Feb. 7, 1991, abandoned.

[30] Foreign Application Priority Data

| Feb. 9, 1990 | [JP] | Japan | 2-030508 |
| Apr. 2, 1990 | [JP] | Japan | 2-087860 |
| Apr. 2, 1990 | [JP] | Japan | 2-087861 |
| Jul. 16, 1990 | [JP] | Japan | 2-185415 |
| Jul. 18, 1990 | [JP] | Japan | 2-189994 |

[51] Int. Cl.$^6$ .................................. G03B 7/00
[52] U.S. Cl. .................................. 354/21; 354/275
[58] Field of Search .................. 354/21, 212, 275, 354/289.12

[56] References Cited

U.S. PATENT DOCUMENTS

| 4,832,275 | 5/1989 | Robertson | 242/71.1 |
| 4,965,600 | 10/1990 | Smart et al. | 354/21 |
| 4,994,828 | 2/1991 | Smart | 354/21 |
| 5,023,642 | 6/1991 | Pagano | 354/21 |
| 5,032,854 | 7/1991 | Smart et al. | 354/21 |

Primary Examiner—David M. Gray
Attorney, Agent, or Firm—Shapiro and Shapiro

[57] ABSTRACT

A camera system comprises: a magazine accommodating a film and an indicating member, the indicating member being brought to different states in accordance with a state of use of the film; and a camera into which the magazine can be loaded and from which the same can be unloaded, the camera including an adjustment mechanism for adjusting the indicating member in accordance with the state of use prior to unloading the magazine, a detection device for detecting the state of the indicating member in response to loading of the magazine into the camera and a control unit for controlling a photographing operation in response to the detection device.

18 Claims, 17 Drawing Sheets

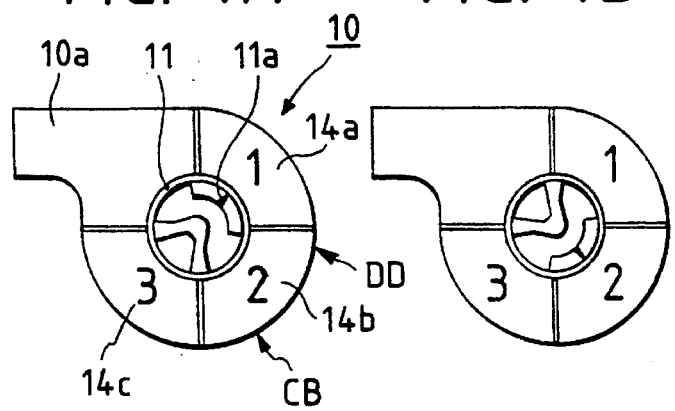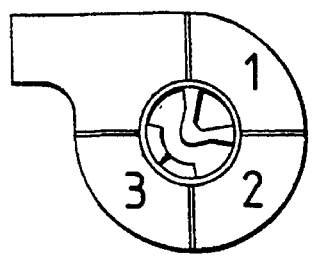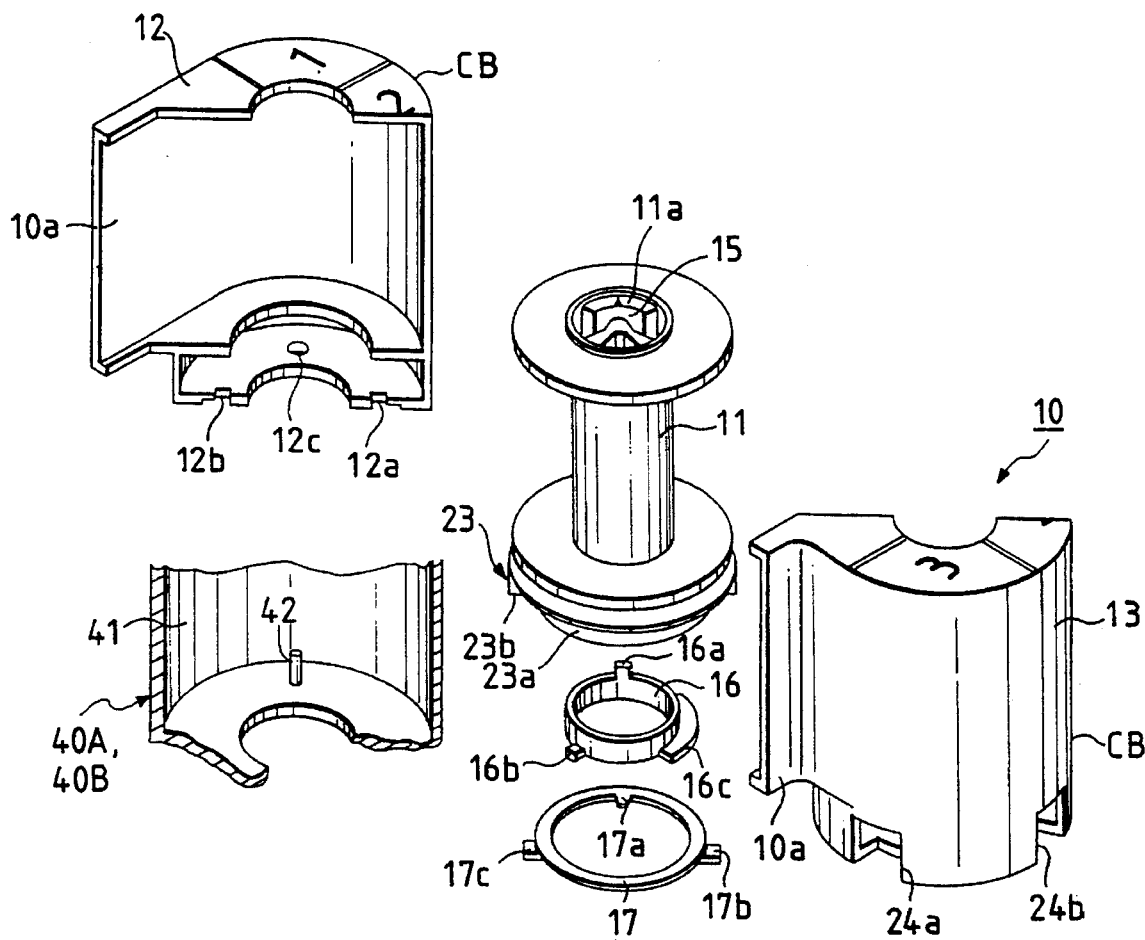

5,463,435

CAMERA

This is a continuation of application Ser. No. 08/209,368 filed Mar. 14, 1994 (abandoned), which is a continuation of application Ser. No. 08/112,479 filed Aug. 27, 1993 (abandoned), which is a continuation of application Ser. No. 07/730,070 filed Jul. 15, 1991 (abandoned), which is a continuation-in-part of each of application Ser. No. 07/652,135 filed Feb. 7, 1991 (abandoned) and application Ser. No. 07/728,208 filed Jul. 10, 1991 (abandoned), which is a continuation-in-part of said application Ser. No. 07/652,135 filed Feb. 7, 1991 now abandoned.

BACKGROUND OF THE INVENTION

1. Field of the Invention

The present invention relates to a film patrone (magazine) for accommodating a photographing film in such a manner that it is wound around a spool to form a roll and relates to a camera into which the above-described film patrone is loaded. More particularly, the present invention relates to a film patrone having a function of identifying/displaying the state of a film (that is, a not-photographed film, a film ejected in state where all of the frames have not been photographed or a film which has been completely photographed) and relates to a camera into which the above-described film patrone is loaded.

2. Related Background Art

A film leader portion protrudes from an ordinary 135-type film patrone in a case where the frames of the accommodated film have not been photographed. Therefore, by winding up the film leader portion into the patrone at the time of rewinding the film after the photographing operation, whether or not the accommodated film has been photographed can be identified in accordance with whether or not the film leader portion protrudes from the patrone.

In a case where the film is to be removed from a camera when only some of the frames have been photographed, the patrone must be stored with the film leader portion protruding therefrom in order to permit subsequent winding of the film when it is again loaded in the camera for the purpose of exposing the unused frames. Therefore, there arises a problem in that it is impossible to identify whether or not the patrone is unused or has been partially used. As a result, there has been a risk of a double exposure when a partially used film is mistakenly thought to be unused.

SUMMARY OF THE INVENTION

An object of the present invention is to provide a camera system with which the state where the film has been used can be identified.

In order to achieve the above-described object, the structure of the present invention comprises a patrone having a member which is brought into a plurality of different states and a camera for detecting the state where the film in the loaded patrone has been used, adjusting the state of the above-described member in accordance with the detected state where the film has been used and detecting the state of the adjusted member.

Since the present invention is constituted as described above, whether the film has been photographed or the film has been ejected in a state of partial use can be discriminated. Therefore, a process required to be performed from the loading of the patrone to the commencement of the photographing operation can be determined.

Other and further objects, features and advantages of the invention will be appear more fully from the following description.

BRIEF DESCRIPTION OF THE DRAWINGS

FIGS. 1A, 1B and 1C respectively illustrate a film usage state displaying function of a patrone according to the present invention;

FIG. 2 is a partial perspective view which illustrates the patrone and the patrone chamber formed in the camera according to a first and a second embodiment;

DETAILED DESCRIPTION OF THE PREFERRED EMBODIMENTS

Figure 3:
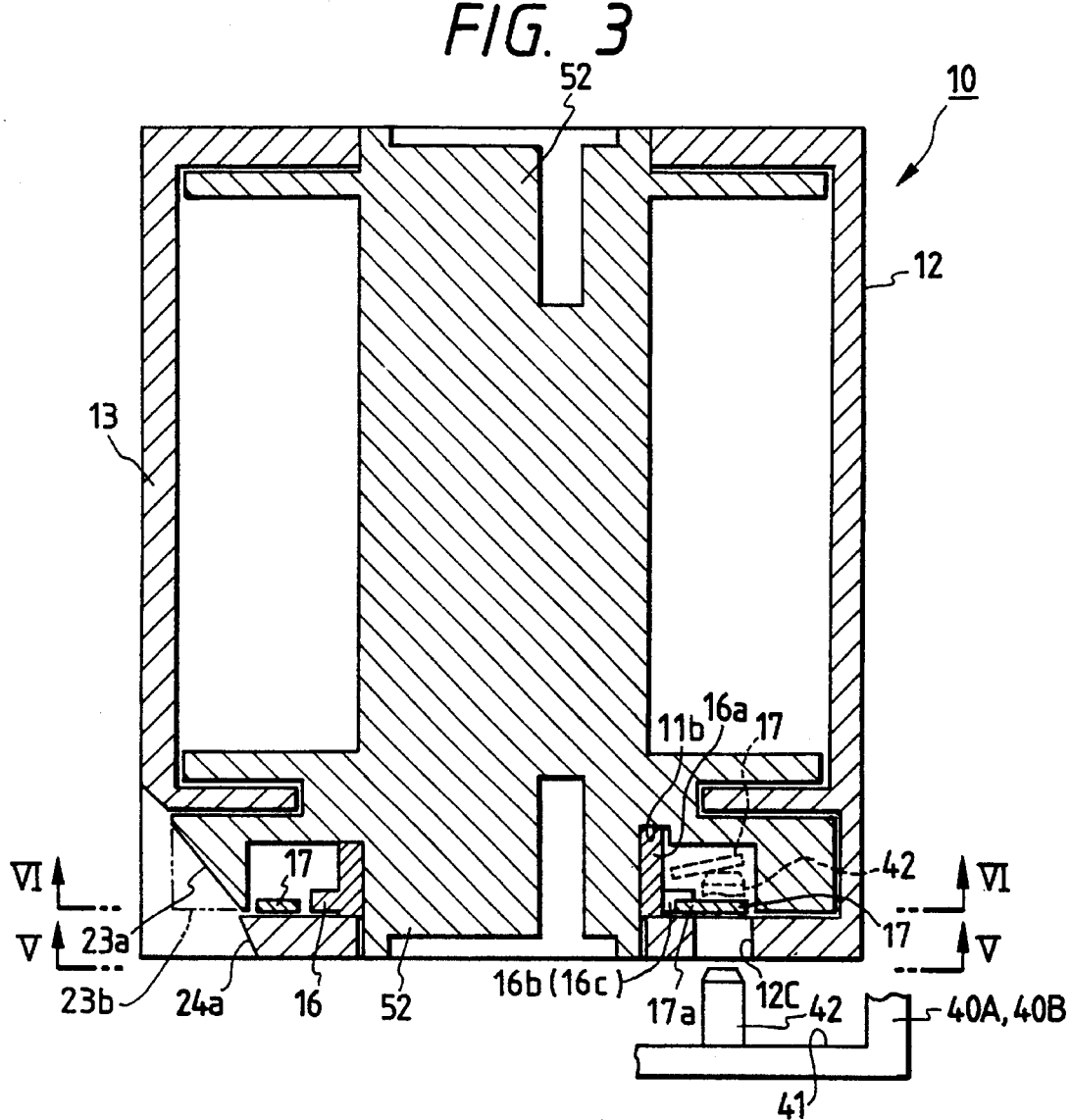
FIGS. 3 and 4 respectively are vertical cross sectional views taken along line III—III and IV—IV of FIG. 5.

The present invention will now be outlined generally and thereafter will be described in detail.
(1) Outline of Patrone FIGS. 1A, 1B, 1C and 2 respectively illustrate a patrone according to the present invention.

A patrone 10 is structured similarly to that disclosed in U.S. Pat. No. 4,832,275 and comprises a spool 11 to which a film is wound, a cylindrical body CB in which a space for accommodating a film (omitted from illustration) is formed by a pair of cases 12 and 13 and which rotatably accommodates the spool 11, an identifying portion DD for displaying/identifying the state of the film, and a film feeding mechanism (omitted from illustration). As shown in FIG. 2, the cylindrical body CB is constituted by a pair of the cases 12 and 13, the cylindrical body CB having a projecting lip portion 10a. Although the detailed description about the film feeding mechanism is omitted here, the leading portion of the film has been previously introduced into the patrone 10 so that the film can be sent/rewound to the patrone 10 by rotating the spool 11.

(2) Outline of Displaying/Identifying Function

As shown in FIGS. 1A, 1B and 1C, the top end surface of the patrone 10 is sectioned into four regions among which identifying number "1" represented by reference numeral 14a, "2" represented by reference numeral 14b and "3" represented by reference numeral 14c are respectively displayed by printing or the like in the thus-created three regions. The three identifying numbers showing the states how the film in the patrone has been used. An index 11a which is able to rotate in accordance with the movement of the spool 11 is further provided in such a manner that it indicates any one of the identifying numbers of the sections 14a, 14b and 14c in accordance with the position at which the spool 11 is stopped after its rotation so that the three states of the film may be displayed. That is, when the identifying number "1" represented by reference numeral 14a is indicated, a fact is displayed that the film has not been used (non-exposed). When the identifying number "2" represented by reference numeral 14b is indicated, a fact is displayed that the ejected film is an incompletely-used film in which its frames have been used by a number which is larger than one and as well as smaller than the number of the overall frames. When the identifying number "3" represented by reference numeral 4c is indicated, a fact is displayed that the film is a completely used (photographed) film in which all of its frames have been used.

According to this embodiment to be described later, the rotation of the spool 11 is controlled at the time of the completion of the rewinding of the film in such a manner that, when the film is ejected in a state where all of its frames have not been used, the identifying number "2" is displayed in accordance with a command of this ejection and, when a command of rewinding the film is issued after all of the frames have been used, the identifying number "3" is displayed. Therefore, a user is, from the film patrone ejected from the camera, able to know the state of use of the film accommodated in the patrone 10. This embodiment is structured in such a manner that a double exposure can be assuredly prevented when the identifying number "2" or "3" is displayed.

The above-described identifying numbers "1", "2" and "3" respectively represented by reference numerals 14a, 14b and 14c may be replaced by, for example, characters "new", "incomplete" and "complete" or other digits.

(3) Ejection of Incompletely-Used Film

In order to resume photographing the non-exposed portion of the incompletely-used film after the patrone 10 accommodating this film has been reloaded into the camera, information about the number of the photographed frames must be recorded, held and transmitted to the camera into which the patrone 10 has been reloaded. The above-described operations can be performed by, for example, forming a storage portion comprising an EEPROM or RAM on the surface of the patrone 10 and disposing a device for recording/reading the above-described storage portion, or by applying a magnetic recording medium on the film and by disposing a magnetic head for writing/reading in the camera. The description about the information processing apparatus to perform the above-described operation is omitted here.

(4) Outline of the Camera

The overall cost of a camera will generally be higher in the above-described case where the information processing apparatus is provided for the camera in order to resume the photographing of the incomplete-used film in the patrone which has been temporarily ejected. Accordingly, the description will be made about a camera 40A which is able to use the reloaded patrone which has been ejected halfway and a camera 40B which cannot use the patrone of this type.

That is, the camera 40A is arranged in such a manner that information about the number of the photographed frames is recorded on the patrone 10 or the recording medium formed on the film when the patrone 10 is ejected halfway. Furthermore, when the rewinding of the film has been completed, the position at which the spool 11 is stopped after the rotation is controlled to the position corresponding to "2" as shown in FIG. 1B. When the above-described patrone 10 is reloaded, the recorded information is read from the storage portion and the feeding of the film is controlled so as to resume photographing the non-exposed frames of the film.

As to the camera 40B, since the camera of this type has no information processing apparatus for recording information about the number of the photographed frames at the time of the halfway ejection of the patrone 10, the position at which the spool 11 is stopped after the rotation is controlled to the position corresponding to "3" as shown in FIG. 1C at the time of the completion of the film rewinding operation. Then, the photographing of the above-described patrone 10 is inhibited. As described later, each of the cameras 40A and 40B is arranged in such a manner that the film reloading is inhibited, a warning is given to a user or photographing is inhibited in a case where its spool 11 is controlled to the position corresponding to "3" after the rotation.

In a case where the patrone 10 in a state of "2", that is, the halfway patrone 10 ejected, is intended to be again reloaded into the camera 40B, the commencement of the non-exposed region on the film cannot be recognized since the camera 40B has no information reading apparatus. Therefore, loading of it is mechanically inhibited similarly to the above-described case of "3" or, even if it is reloaded, the ensuing photographing operation is inhibited.

In a case where a system is constituted in which no halfway ejection is considered, the structure may be arranged in such a manner that only the two states "1" and "3" are displayed.

(5) Outline of Function of Inhibiting the Reloading

As described above, the structure according to the present invention comprises a mechanism for mechanically inhibiting the loading of the patrone 10 into the camera in a case where the film is in a specific state for the purpose of preventing the double exposure as well as a function of displaying the state how the film has been used. In order to realize this, a blocking mechanism realizing a blocking state and a non-blocking state is disposed outside (in a lower portion according to this embodiment) the patrone 10. On the other hand, the camera has a device for switching over the blocking mechanism of the patrone 10 in accordance with the state how the film has been used and an inhibition mechanism for allowing the patrone 10 to be loaded into the camera when the blocking mechanism is in the non-blocking state and inhibiting the loading when the same is in a blocking state.

(6) Outline of Function of Detecting How the Film is Used

As described above, the camera 40A can be loaded with the patrone 10 the display state of which is "1" or "2". Since the photographing operation to be performed by the camera in a state "1" is different from that in a state "2", it must be detected at the time of loading the patrone 10. As will be described later, this is achieved by a structure which is used to control the position at which the spool 11 is stopped after the rotation.

Now, first to fourth embodiments of the present invention will be described.

(I) First Embodiment

I-I: Structure of Patrone

As described above, according to this embodiment, any one of "1", "2" and "3" is displayed in accordance with the state how the film has been used. Furthermore, the predetermined operation is performed by the camera in synchronization with the above-made display. Therefore, the deflection of the indicated positions between the three display states "1", "2" and "3" due to the rotation of the spool 11 at other times is prevented.

Figure 4:
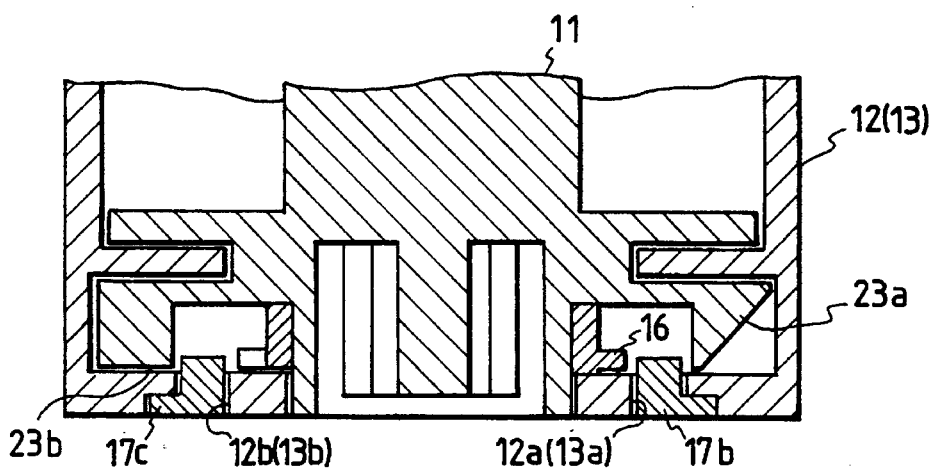
Figure 5:
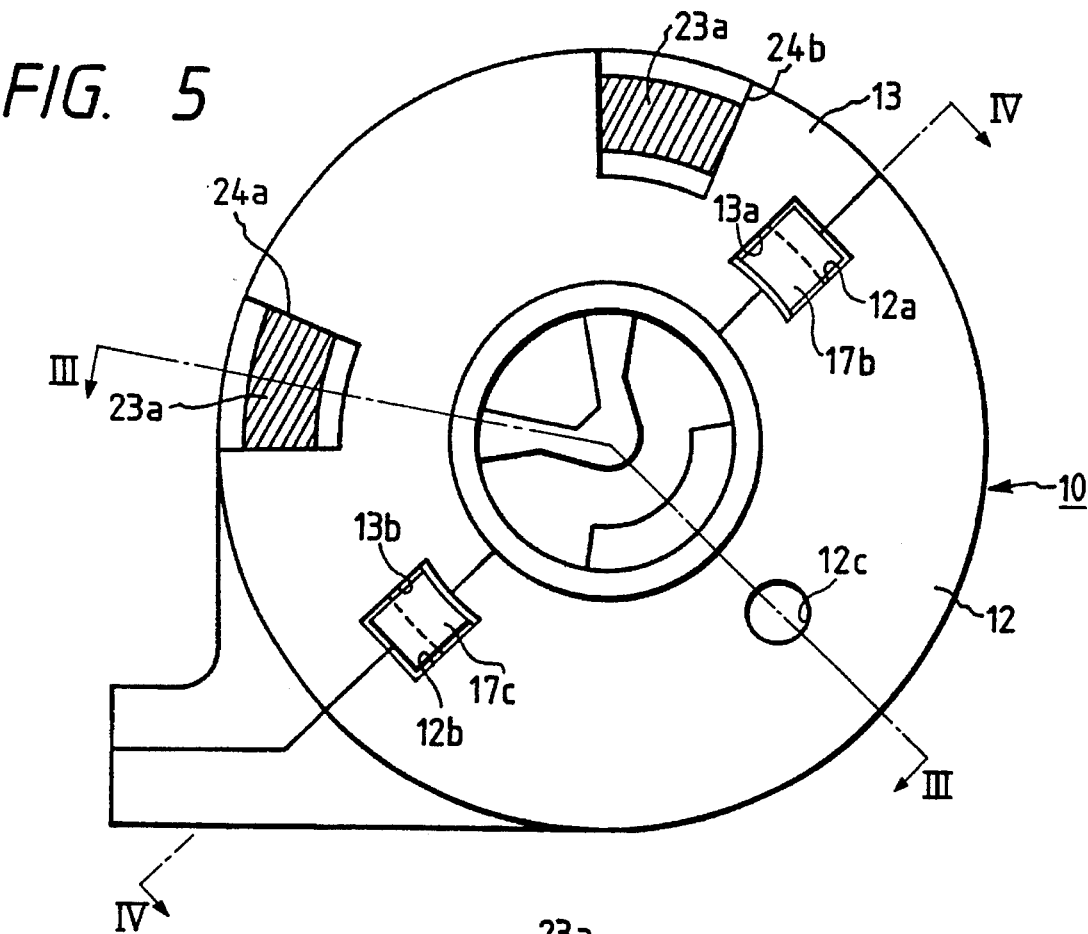
FIGS. 5 and 6 respectively are cross sectional views taken along lines V—V and VI—VI of FIG. 3 in a state of "1"

Referring to FIGS. 2 to 4, a ring 16 and a fastening ring 17 constitute a mechanism for preventing an erroneous display made due to the change in the position indicated by the index 11a caused from the undesirable rotation of the spool 11. This is done by restricting the rotation of the spool 11 in a case where the patrone 10 has not been loaded into the camera. The ring 16 is fastened to the spool 11 below the patrone 10 and thereby a projection 16a is fitted within a groove 11b (see FIG. 3) formed in the spool 11, the ring 16 and the spool 11 are integrally rotated. The fastening ring 17 is disposed outside the ring 16 and is made of a spring member having, on the inner surface thereof, a tab portion 17a which can be selectively disposed between projections 16b and 16c formed on the outer surface of the ring 16. Projecting hooking portions 17b and 17c are, as shown in FIGS. 4 and 5, received/secured by hooking grooves 12a, 12b, 13a and 13b formed in the lower joint portion between the cases 12 and 13 of the patrone 10. As shown in FIG. 3, in a case where the patrone 10 is not loaded in a camera, the tab portion 17a is disposed between the projection 16b and 16c so that the rotation of the spool 11 is restricted.

The above-described state of the ring 16 and the fastening ring 17 is cancelled when the patrone 10 is loaded into the camera. That is, as shown in FIGS. 2 and 3, a restriction releasing pin 42 is formed in the bottom portion of a patrone chamber 41 of each of the camera 40A and 40B. The restriction releasing pin 42 is fitted within a hole 12c formed in the surface of the patrone 10 to push upward the fastening ring 17 against the elastic force of the fastening ring 17 as designated by a phantom line shown in FIG. 3. As a result, the tab portion 17a is held at a position at which it is not disposed between the projections 16b and 16c, causing the spool 11 to be freely rotated. In this case, since the fastening ring 17 is assuredly held by the cases 12 and 13, undesirable friction or load is not given to the spool 11.

Figure 6:
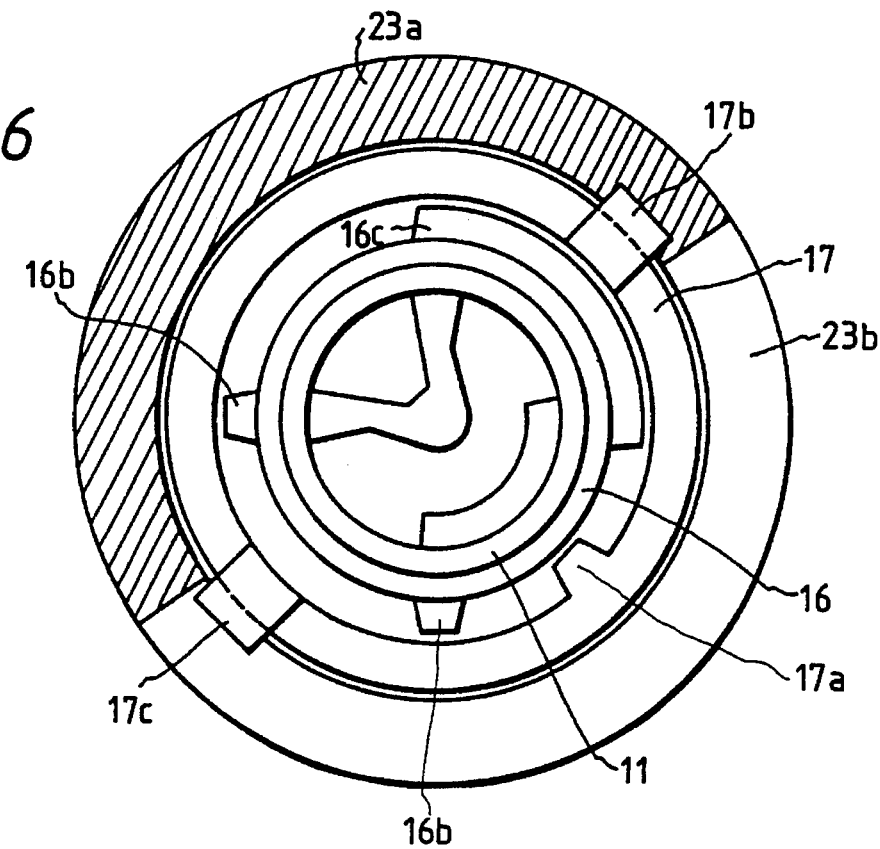

As shown in FIG. 6, the spool 11 is able to rotate in each of regions between the two projections 16b and 16c (there are three regions to correspond to the three states of the film). Even if the spool 11 is rotated in the above-described regions, the index 11a is not deviated from any of the regions of the identifying numbers 14a, 14b and 14c. The control is performed in such a manner that, when the rewinding of the film has been completed, the spool 11 is stopped at any of the above-described regions which correspond to the state how the film has been used. The control mechanism to realize the above-described operation will be described later.

Figure 7:
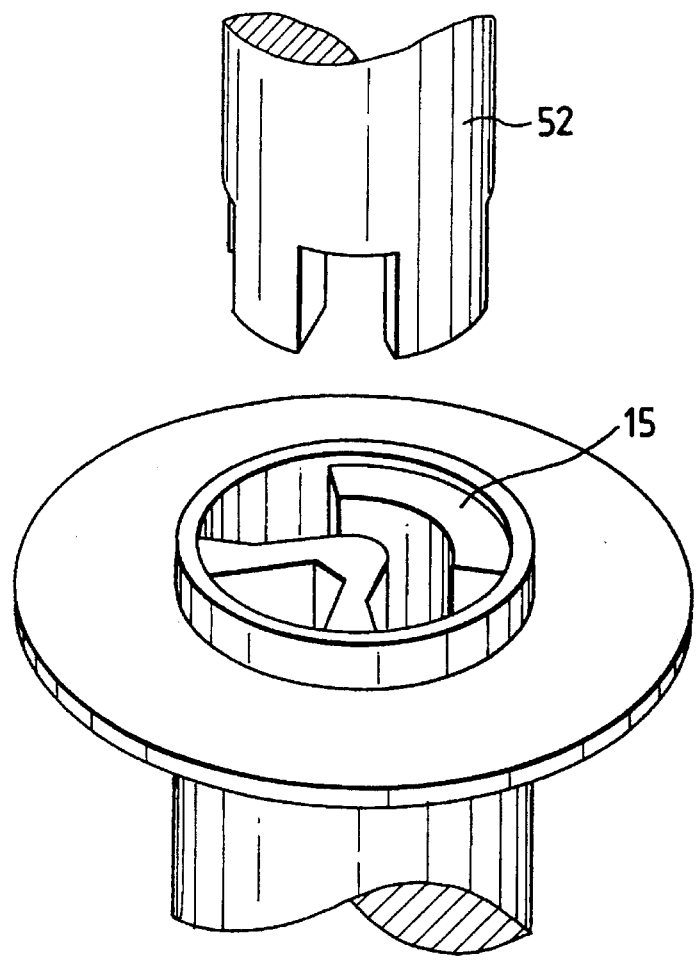
FIG. 7 is an enlarged perspective view which illustrates a fork and a fastening portion.
Figure 8A:
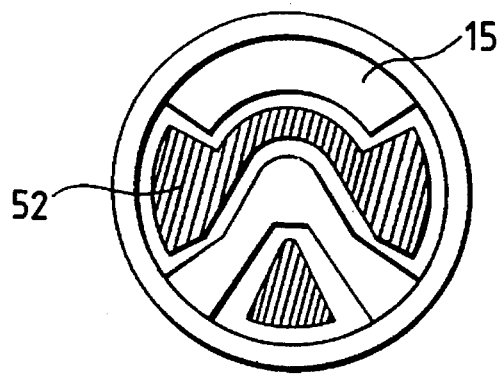
FIGS. 8A and 8B illustrate a state where the fork and the fastening portion are fastened to each other.

Referring to FIGS. 7 and 8, a fastening portion 15 of the spool 11 and a fork 52 of the camera which is arranged to be fastened to the fastening portion 15 will now be described.

Figure 8B:
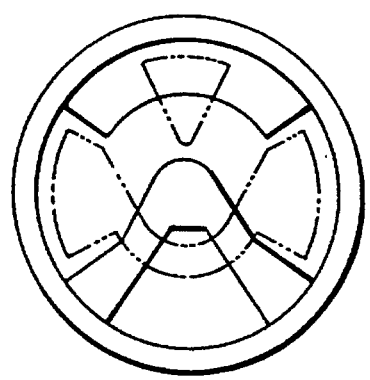

According to this embodiment, a characteristic shape is formed as shown in the drawings as an alternative to a spline employed in an ordinary 135-type patrone. With the 135-type spline, fastening can be realized in two ways in an angular range of 360°. According to this embodiment, the fastening can be realized at only the rotational position shown in FIG. 8A and the fastening in other position is inhibited. Two fastening portions 15 each of which is constituted as described above are symmetrically formed in the vertical direction of the spool 11 at the same rotational angular position. FIG. 8B illustrates a state where fastening cannot be realized at a position rotated from the position shown in FIG. 8A by an angular degree of 180°.

The reason why the structure is arranged in such a manner that there is only one way of fastening within 360° will now be described.

As described above, according to this embodiment, the control is performed in such a manner that the spool 11 is stopped at a position which corresponds to the state how the film has been used (whether patrone has been ejected halfway or frames have been completely used). According to the above-described first embodiment and a second embodiment to be described later, the above-described control is performed by detecting the rotational position of the fork 52 of the camera. Therefore, if there are two ways of fastening within 360° as is in the case of the 135-type spline, it is impossible to determine the way of fastening which is being realized. Therefore, the spool 11 cannot be stopped at a desired position.

Furthermore, two window portions 24a and 24b are, as shown in FIGS. 2 and 5, formed in the lower portion of the patrone 10 at positions away from each other by an angular degree of about 90°. A surface portion 23 formed in the lower portion of the spool 11 and arranged to be integrally rotated with the spool 11 appears from the above-described windows 24a and 24b. The surface portion 23 is formed by an inclined surface 23a and a non-inclined or blocking surface 23b each of which is the half circumference of the spool 11 as shown in FIG. 6 which illustrates the lower surface of the spool 11, the inclined surface 23a and the non-inclined surface 23b having the cross sectional shapes as shown in FIGS. 3 and 4. Therefore, the above-described inclined surface 23a and the non-inclined surface 23b selectively appear from the window portions 24a and 24b as follows in accordance with the stop position of the spool 11 (how the film has been used):

| State | Window portion 24a | Window portion 24b |
|---|---|---|
| "1" | inclined surface 23a | inclined surface 23a |
| "2" | inclined surface 23a | non-inclined surface 23b |
| "3" | non-inclined surface 23b | non-inclined surface 23b |

I-2: Structure of Camera 40A

Figure 9:
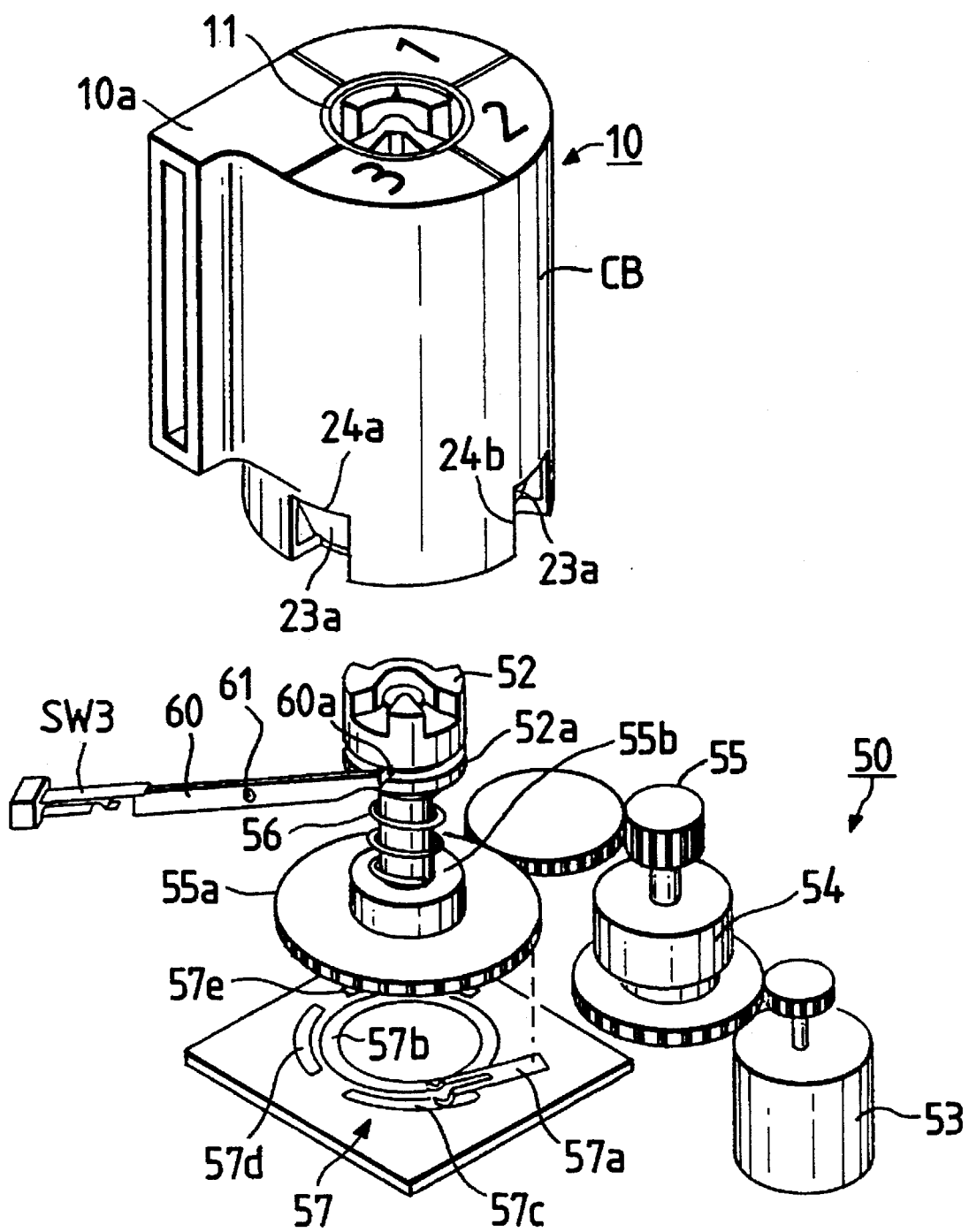
FIG. 9 is a perspective view which illustrates a patrone and a film rewinding mechanism in the camera according to the first and second embodiments.

The camera 40A, as shown in FIG. 9, comprises a spool drive device 50 for rotating the spool 11 of the patrone 10 and a control unit 51 (CPU) for controlling the position at which spool 11 is stopped after the rotation by the spool drive device 50 in accordance with the state how the film has been used. See FIG. 10.

The fork 52 is fastened to the fastening portion 15 formed in the lower portion of the spool 11, the fork 52 being rotated by a motor 53 via a reduction gear mechanism 55 having a clutch 54 so as to rotate the spool 11. As a result, the film is fed or rewound to the patrone 10. A spring 56 constitutes a known retracting mechanism for preventing the interference between the fastening portion 15 and the fork 52 even if there is a phase deviation taken place at the time of loading the patrone 10. Although the fork 52 is retracted downward if the phase deviation takes place, the fork 52 is always integrally rotated with a shaft 55b which is integrally rotated with a fork gear 55a. When the film is wound up after it has been fed, the fork 52 and the motor 53 are separated from each other by the clutch 54.

The position of the fork 52 after the rotation is detected by a fork encoder 57. The fork encoder 57 comprises a brush 57a which can be integrally rotated with the fork gear 55a, the fork encoder 57 further comprising a common pattern 57b, segment patterns 57c, 57d and 57e. The states in which the brush 57a is placed on the segment patterns 57c, 57d and 57e respectively correspond to the states where the index 11a shows the identifying numbers 14a, 14b and 14c, that is, "1", "2" and "3". A groove 52a is formed around the lower portion of the fork 52, the groove 52a being arranged to receive a front portion 60a of a lever 60 rotatably pivoted on a fixed pin 61. The other end portion of the lever 60 is arranged to be fastened to a switch SW3. Therefore, when the fork 52 is fastened to the fastening portion 15 and thereby it is projected to its uppermost position by the spring action of the spring 56, the switch SW3 is switched on. When the fork 52b is retracted to a lower portion due to the phase deviation taken place between the fork 52 and the fastening portion 15 at the time of loading the patrone 10, the switch SW3 is switched off. Thus, the structure is constituted in such a manner that the fastening/non-fastening between the fork 52 and the fastening portion 15 can be detected.

Figure 10:
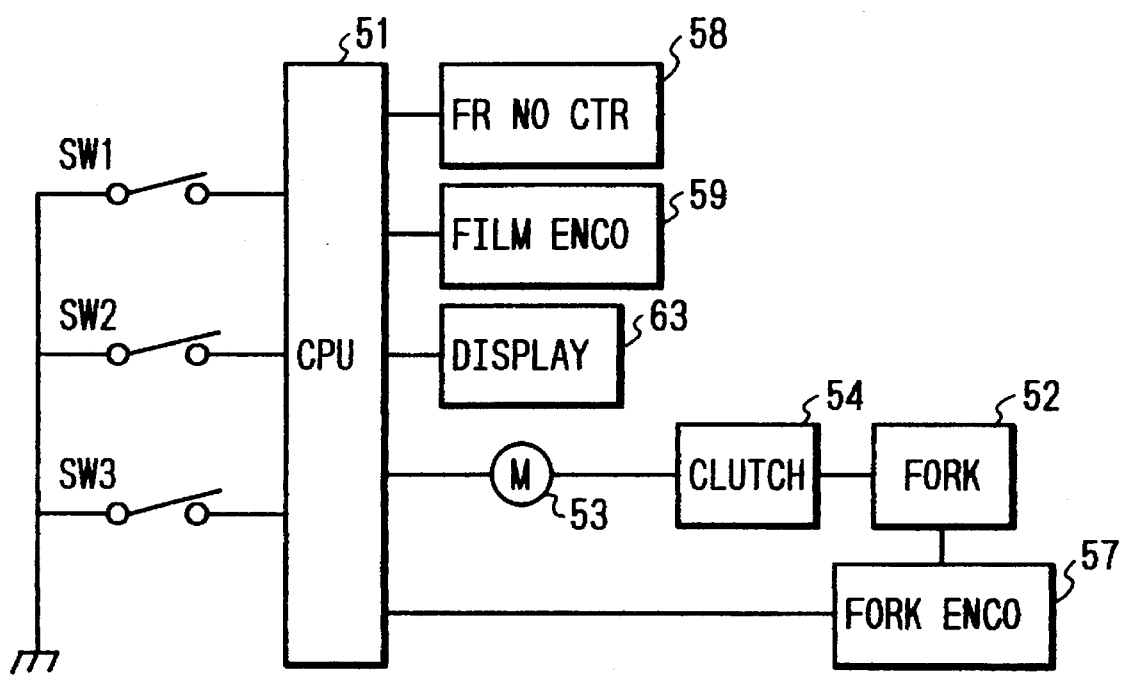
FIG. 10 is a block diagram which illustrates a spool operating device and a control device in the camera.

Referring to FIG. 10, a switch SW1 is an exposure release switch and a switch SW2 is a halfway rewinding switch which is operated when the film is rewound before the final frame has been photographed, the switch SW1 automatically commencing rewinding in accordance with the detection of the tension generated at the end portion of the film after the final frame has been photographed. Reference numeral 58 represents a frame counter and 59 represents a film encoder for detecting the quantity of the movement of the film for feeding the frames of the film. The information thus-obtained is transmitted to the control unit 51 so that predetermined controlling operations are performed. Reference numeral 63 represents a display composed of liquid crystal or the like and disposed on the outer surface of the camera for the purpose of informing a user of a variety of information items.

Figure 11:
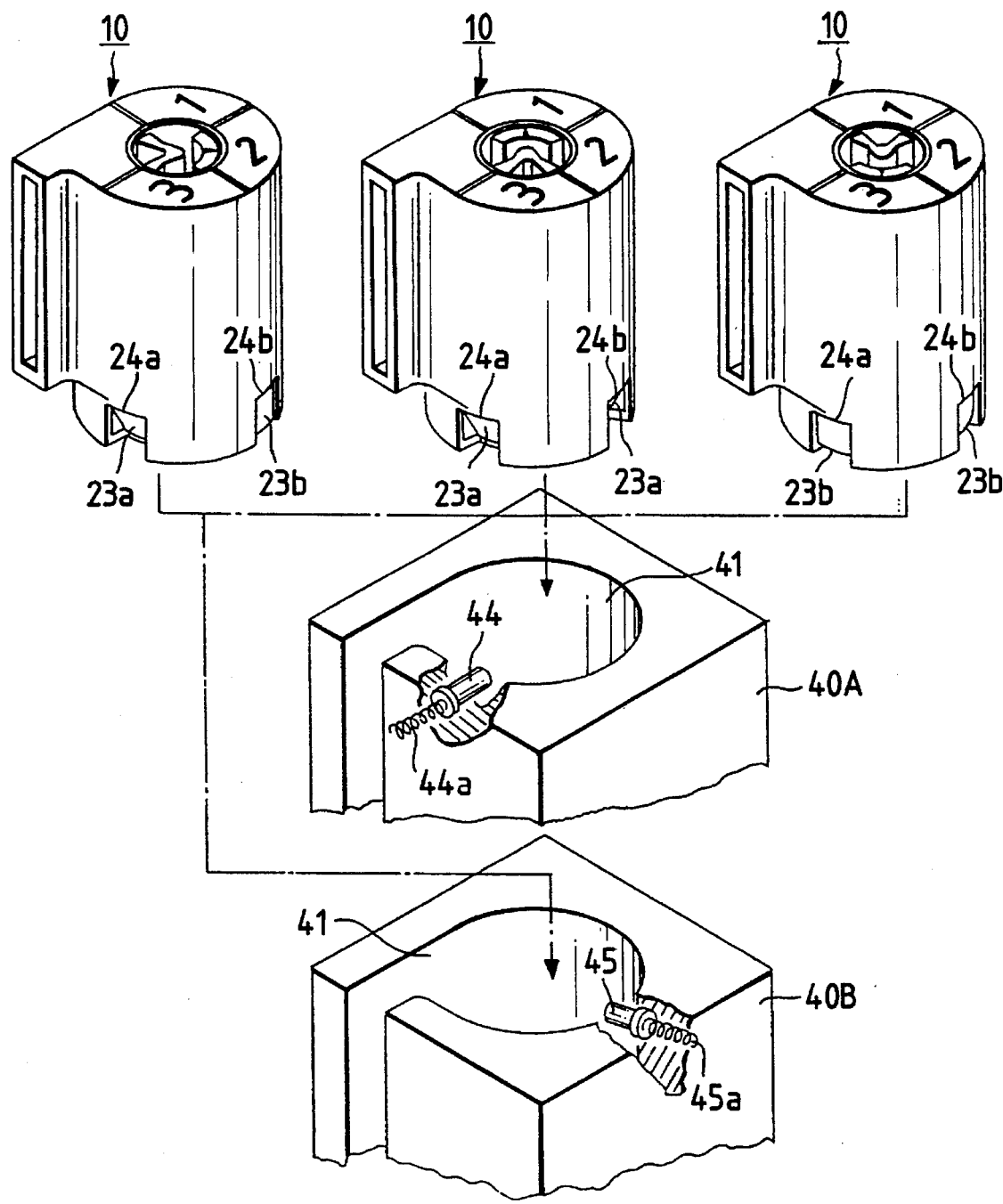
FIG. 11 is a perspective view which illustrates states where loading is inhibited by the patrone and two types of the camera.
Figure 12A:
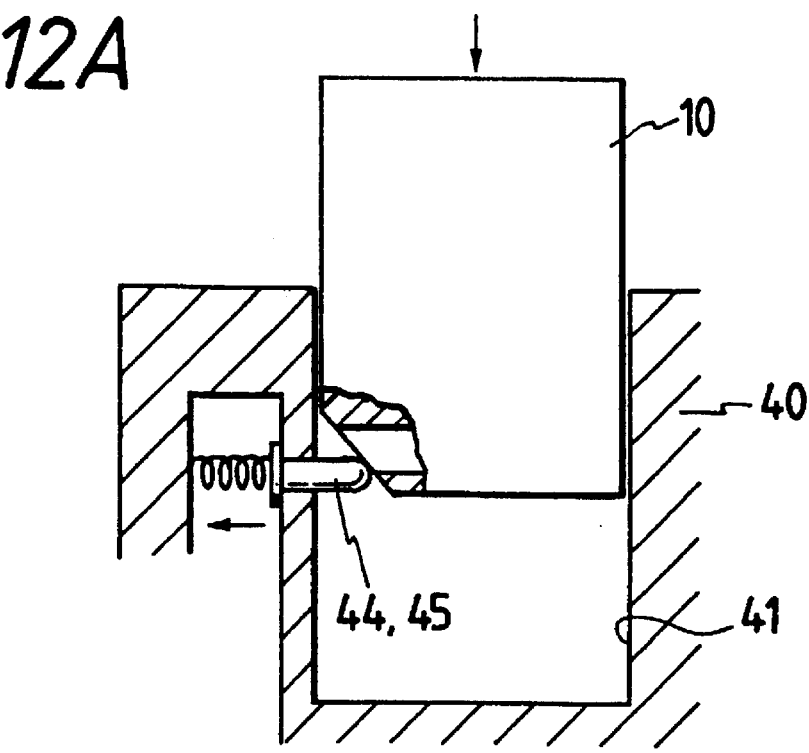
FIGS. 12A and 12B illustrate the operation of a loading inhibiting mechanism.
Figure 12B:
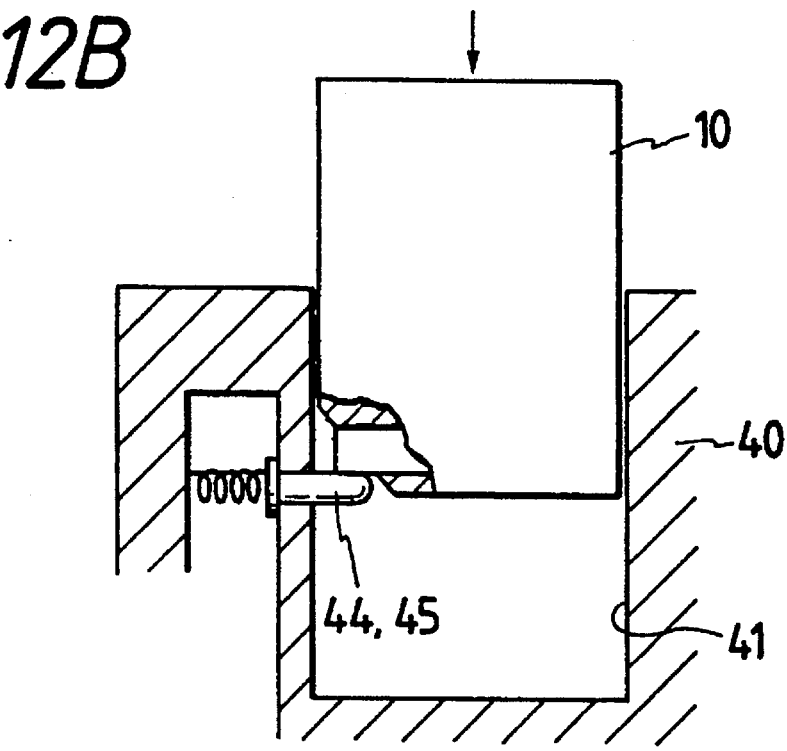

As shown in FIG. 11, in a portion of the patrone chamber 41 which corresponds to the portion through which the window portion 24a passes at the time of loading the patrone 10, a loading inhibiting pin 44 (45) retractably projects by the urging force of a spring 44a (45a) in a direction perpendicular to the direction in which the patrone 10 is loaded. Therefore, as shown in FIGS. 12A and 12B, when the inclined surface 23a appears from the window portion 24a (24b), the loading inhibiting pin 44 (45) is retracted at the time of the patrone loading by the action of the inclined surface 23a so that the loading of the patrone 10 is allowed. When the non-inclined surface 23b appears from the window portion 24a (24b), the non-inclined surface 23b interferes with the loading inhibiting pin 44 (45) at the time of the loading so that the loading of the patrone 10 is mechanically inhibited. The spool drive device 50 and the like are omitted from FIG. 12.

I-3: Operation of Camera 40A

The operation in a case where patrone 10 and the camera 40A are combined with each other will now be described.

When the patrone 10 loaded into the camera is ejected after the photographing has been completed, the control unit 51 determines how the film has been used and accordingly controls the position at which the spool 11 is stopped after rotation. First, the operation at this time will be described with reference to FIG. 13.

In step S101, it is determined whether or not the relay switch SW1 has been operated after the patrone 10 has been loaded. If it has not been operated, the process proceeds to step S104 in which the position at which the spool 11 is stopped is controlled in such a manner that its index 11a indicates "1". If the relay switch SW1 has been operated, the process proceeds to step S102 in which it is determined whether or not the halfway rewinding switch SW2 has been operated. It the halfway rewinding switch SW2 has been operated, the process proceeds to step S105 in which the position at which the spool 11 is stopped is controlled to "2". If the halfway rewinding switch SW2 has not been operated, it is, in step S103, determined whether or not the tension of the end portion of the film has been detected. If it has been detected, the process proceeds to step S106 in which the position at which the spool 11 is stopped is controlled to "3". If the tension of the end portion of the film has not been detected, there is no corresponding state due to an erroneous determination. Therefore, an occurrence of an error is displayed by the display 63 in step S107 before the process proceeds to step S106 in which the position at which the spool 11 is stopped is controlled to "3". The above-described operation is performed in such a manner that an assumption is made that the stop position is "3" for the purpose of assuredly preventing the double exposure.

As described above, the position at which the spool 11 is stopped in each of the states is allowed to be in an interval (allowable play) between the projections 16b and 16c and the tab portion 17a. Therefore, the structure may be arranged in such a manner that the rotation of the spool 11 is controlled to be stopped in the above-described interval. Specifically, when the fork encoder 57 has detected the fact that the fork 52 has been brought to a predetermined position, the motor 53 is stopped to stop the spool 11.

The operation of loading the patrone 10 will now be described in accordance with each of the three states how the film has been used.

Since the inclined surface 23a appears from the window portion 24a when the patrone 10 in a state which is stopped at "1" is loaded, the loading inhibiting pin 44 is retracted by the inclined surface 23a (see FIG. 12A) so that the loading of the patrone 10 is allowed. The patrone 10 in a state where the indication is stopped at "2" is also allowed to be loaded. The patrone 10 which is stopped at "3" cannot be loaded because the non-inclined surface 23b appears from the window portion 24a and thereby the loading inhibiting pin 44 interferes with the non-inclined surface 23b (see FIG. 12B).

Figure 14:
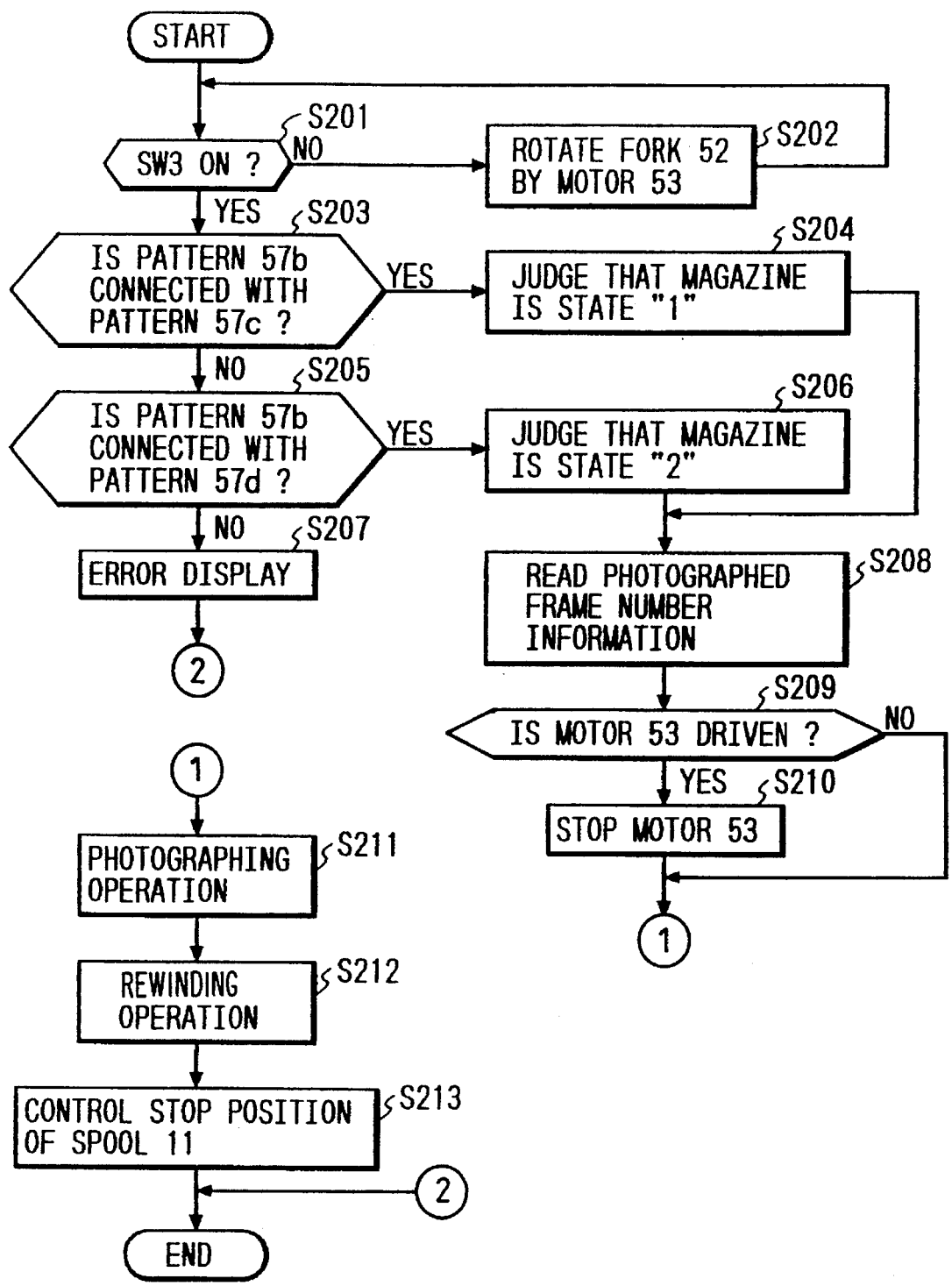
FIG. 14 is a flow chart which illustrates processes to be performed after the patrone has been loaded into a camera 40A.

In a case where the patrone 10 in a state where the indication is stopped at "1" or "2", a fact that the subject state is "1" or "2" is detected in a sequence shown in FIG. 14.

After the patrone 10 has been loaded, it is, in step S201, determined whether the switch SW3 has been switched on or off and a fact is further determined whether or not the fork 52 has been fastened to the fastening portion 15. If the switch SW3 has been switched on, the fork 52 is correctly fastened to the fastening portion 15. Therefore, the process proceeds to step S203 in which whether or not the common pattern 57b and the segment pattern 57c are connected to each other is determined. If they are, the process proceeds to step S204 in which a fact is determined that the state of display of "1" is made by the index 11a before the process proceeds to step S209. If it has been, in step S203, determined that the common pattern 57b and the segment pattern 57c are not connected to each other, it is, in step S205, examined whether or not the common pattern 57b and the segment pattern 57d are connected to each other. If they are connected to each other, it is determined in step S206 that the indication of "2" is made. Then, in step S208, information about the number of the photographed frames is read before the process proceeds to step S209. In a case where it is determined that they are not connected to each other, a determination is made that the subject state is neither "1" nor "2" although the actual state is either "1" or "2". Therefore, an occurrence of an error is displayed on the display 63 to warn a user and the process is completed here.

On the other hand, in a case where a determination is made in step S201 that the switch SW3 has been switched off, the fork 52 is not fastened to the fastening portion 15 due to the phase deviation. Therefore, the fork 52 is rotated by the motor 53 in step S202. As a result, the fork 52 and the fastening portion 15 are fastened to each other, causing the switch SW3 to be switched on. Then, it is detected whether the state is "1" or "2" by a judgement made similar to the above-described case. In step S209, if the motor 53 is being rotated (in a case where it has been rotated in step S202), it is stopped in step S210 before the process proceeds to step S211 in which the photographing operation is commenced. Then, the process proceeds to step S213 via the rewinding operation (rewinding after the final frame has been photographed and rewinding from the halfway state included) performed in step S212. In step S213, the state how the film has been used is determined as described with reference to FIG. 13 so that the rotation of the spool 11 is controlled to be stopped accordingly. Thus, the operation is completed here.

The direction in which the fork 52 is rotated in step S202 may be either the direction in which the film is fed or the direction in which the film is rewound because the fork 52 is rotated for the purpose of fastening the fork 52 to the fastening portion 15 to detect the position of the spool 11 the moment the above-described fastening state is realized. Furthermore, even if the fork 52 in a state where it is not fastened to the fastening portion 15 due to the phase deviation is rotated by the motor 53, the spool 11 is not undesirably rotated due to the contact friction before the correct fastening to the fastening portion 15 is made because the spring 56 is arranged to have weak urging force.

An advantage obtainable from a structure which can determine whether the patrone 10 thus-loaded is stopped at the position "1" or "2" will now be described.

As a method of recording information about the number of the photographed frames of the film, signals denoting whether each of the frames is non-exposed or exposed may recorded on a magnetic medium applied on the surface of the film. In order to commence the next photographing operation after a patrone 10 ejected halfway at the state "2" has been reloaded, an operation must be performed such that the film is successively wound up to detect the first frame denoted by a non-exposed signal. If the camera cannot judge whether the state of the film in the patrone 10 is "1" or "2", when the actual state is "1", a similar process must be performed such that the film is wound up the confirm the signal denoting the non-exposed frame. However, when the judgement whether "1" or "2" can be made at the moment the patrone 10 is loaded, as in this embodiment, the last-mentioned process can be eliminated, causing a practical advantage to be obtained.

I-4: Structure of Camera 40B

The difference from the camera 40A will now be described. The camera 40B has no segment pattern 57d shown in FIG. 9 because the spool 11 is not stopped at position "2" after the rotation. Furthermore, since the loading of the patrone 10 in a state "2" is inhibited, the necessity for the camera 40B to determine whether the state is "1" or "2" after the loading of the patrone 10 can be eliminated. Therefore, the switch SW3 and the lever 60 provided for the above-described operation are omitted from the structure. In addition, as shown in FIG. 11, the patrone chamber 41 has, as an alternative to the loading inhibiting pin 44, a loading inhibiting pin 45 urged by a spring 45a at a position corresponding to the window 24b passing through at the time of loading the patrone 10, the loading inhibiting pin 45 being retractable in a direction perpendicular to the direction in which the patrone 10 is loaded. Therefore, when the inclined surface 23a appears from the window portion 24b, the loading inhibiting pin 45 is retracted by the action of the inclined surface 23a simultaneously with the loading operation. As a result, the loading of the patrone 10 is allowed. When the non-inclined surface 23b appears from the window portion 24b, the non-inclined surface 23b is interfered with by the loading inhibiting pin 45 simultaneously with the loading operation so that the loading of the patrone 10 is mechanically inhibited. In addition, the control unit 51 performs the control operation in a different manner from that of the camera 40A as will be described later.

I-5: Operation in Camera 40B

The operation in the case where the camera 40B thus-constituted and the patrone 10 are combined will now be described.

Figure 13:
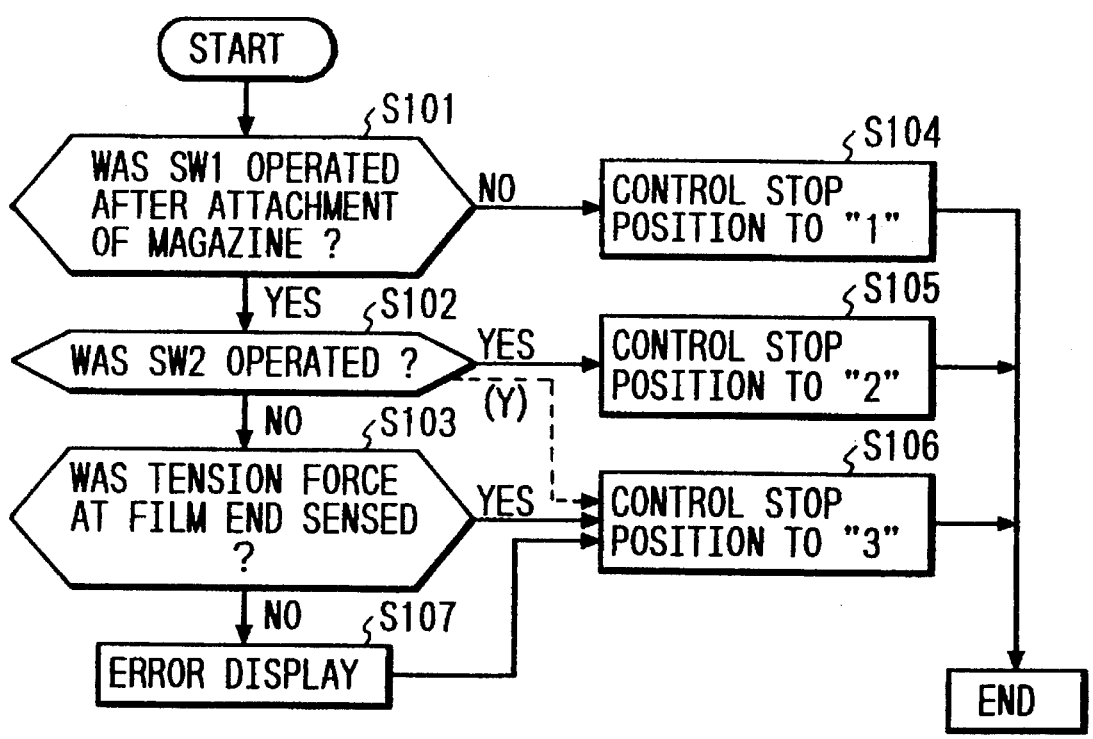
FIG. 13 is a flow chart which illustrates a sequence for determining the state of the film usage.

When the patrone 10 loaded in the camera 40B is ejected after the film therein has been photographed, the control unit 51 determines how the film has been used and controls the position at which the spool 11 is stopped after the rotation. The procedure of this control is the same as that arranged for the camera 40A except that the process, as shown in FIG. 13, proceeds to step S106 when a determination is, in step S102, made that the switch SW2 has been operated (alternative designated by a dashed line shown in FIG. 13). That is, when the patrone 10 is ejected halfway, the control is performed to stop at the position "3" so as to inhibit the photographing of the film in this patrone 10 because the camera 40B has no apparatus for recording information about the number of the photographed frames.

The operations to be performed when the patrone 10 is in the above-described three states will now be described.

In a case where the patrone in the stoppage state "1" is loaded, the loading inhibiting pin 45 slides and retracts from the inclined surface 23a so that the loading of the patrone 10 is allowed because the inclined surface 23a appears from the window portion 24b. The patrone 10 in the stoppage state "2" or "3" cannot be loaded because the loading inhibiting pin 45 is interfered with by the non-inclined surface 23b since the non-inclined surface 23b appears from the window portion 24b.

(II): Second Embodiment

According to the first embodiment, loading of the patrone 10 which is in a state where it cannot be used in the subject camera (the patrone stopped at "3" in the camera 40A and the patrone stopped at "2" or "3" in the camera 40B) is mechanically stopped. In a case where there is no space in the patrone chamber 41 to allow the loading inhibiting pins 44 and 45 to be formed, a structure according to a second embodiment may be arranged in such a manner that the patrone loading is not mechanically inhibited but the state of the loaded patrone is determined in order to display and/or warn of the fact that the patrone cannot be used in the subject camera, and in order to inhibit the photographing operation. The second embodiment is arranged in such a manner that the patrone 10 formed in the same shape as that according to the first embodiment is used and the camera is basically arranged as described above.

II-1: Structure of Cameras 40A and 40B

The portion of each of the cameras 40A and 40B shown in FIG. 9 is formed into the same structure of the camera 40A according to the first embodiment. Both the cameras 40A and 40B have no mechanical inhibiting mechanism as the loading inhibiting pins 44 and 45 shown in FIG. 11. Furthermore, the control unit 51 controls in a slightly different manner between the two cameras 40A and 40B.

II-2: Operation in the Camera 40A

Figure 15:
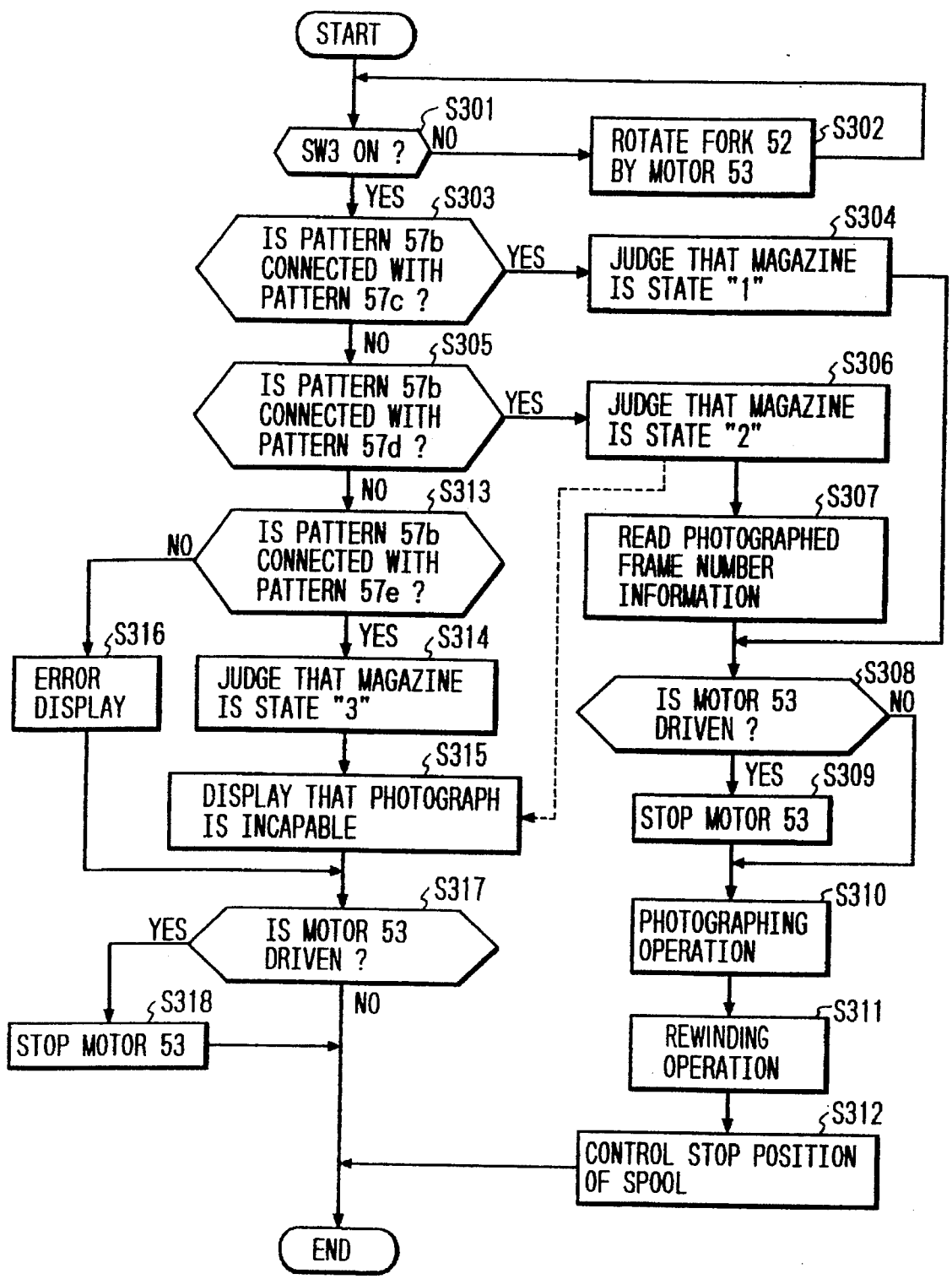
FIG. 15 is a flow chart which illustrates processes to be performed after the patrone has been loaded according to the second embodiment.

Since the structure is arranged as described above and thereby the patrone 10 can be loaded into the patrone chamber 41 regardless of the state of the patrone 10, the process after the loading proceeds as shown in FIG. 15.

FIG. 15 illustrates a procedure after the patrone 10 has been loaded. According to this embodiment, the state of the patrone 10 is detected by using the fork encoder 57 in a manner similar to that according to the first embodiment shown in FIG. 14.

In step 301, it is determined whether or not the switch SW3 has been switched on to examine whether or not the fork 52 has been fastened to the fastening portion 15. If the switch SW3 has been switched on, the process proceeds to step S303 because the fork 52 and the spool 11 are correctly fastened to each other. If the switch SW3 has been switched off, the fork 52 is rotated to be fastened to the fastening portion 15 in step S302. In step S303, whether or not common pattern 57b and the segment pattern 57c are connected to each other is examined. If they are connected to each other, a determination is, in step S304, made that the state is "1" before the process proceeds to step S308. If a determination is made in step S303 that they are not connected to each other, whether or not the common pattern 57b and the segment pattern 57d are connected to each other is examined in step S305. If they are, a determination is made in step S306 that the state is "2" before the frame from which the photographing is resumed is examined in step S307. Then, the process proceeds to step S308. If a determination is made in step S305 that they are not connected to each other, whether or not the common pattern 57b and the segment 57e are connected to each other is examined in step S313. If they are, a determination is made in step S314 that the state is "3" before the process proceeds to step S315 in which a fact that the ensuing photographing cannot be performed is displayed/warned by the display 63 because the film state is "3". Then, the process proceeds to step S317. If a determination is made in step S313 that they are not connected to each other, a fact is detected that the film is not in any of the states "1", "2" and "3". Therefore, the occurrence of an error is displayed on the display 63 in step S316 before the process proceeds to step S317. In step S317, it is determined whether or not the motor 53 is being rotated (in a case where it has been rotated in step S302). If it is being rotated, the rotation is stopped in step S318 and the process is completed. In step S308, it is determined whether or not the motor 53 is being rotated. If it is not being rotated, the process proceeds to step S310, while the same proceeds to step S309 in which the rotation of the motor 53 is stopped before the process proceeds to step S310. In step S310, the photographing operation is performed before the film is rewound in step S311 (rewinding after the final frame has been photographed and halfway rewinding included). Then, the process proceeds to step S312 in which the state how the film has been used is determined similarly to the way shown in FIG. 13, and the control is performed to stop the rotation of the spool 11 before the process is completed. Therefore, the photographing operation of the patrone 10 in the state "1" or "2" is allowed, while, that in the state "3" cannot be subjected to the photographing process.

II-4: Operation of Camera 40B

Camera 40B differs from the camera 40A in the control to be performed when the patrone 10 in the state "2" has been loaded. Step S307 shown in FIG. 15 is omitted and the process proceeds from step S306 to step S315 (as designated by a dashed line shown in FIG. 15). Therefore, the patrone 10 in the state "1" can be photographed, while the photographing of the patrone 10 in the state "2" or "3" is inhibited.

(III) Third Embodiment

According to the first embodiment, the control of rotation/stop of the spool 11 and detection of the state of the patrone 10 at the time of the loading are performed by using the fork encoder 57. According to this embodiment, a photosensor disposed in the bottom portion of the patrone chamber 41 performs a similar function.

III-1: Structure of Patrone 10

Figure 16:
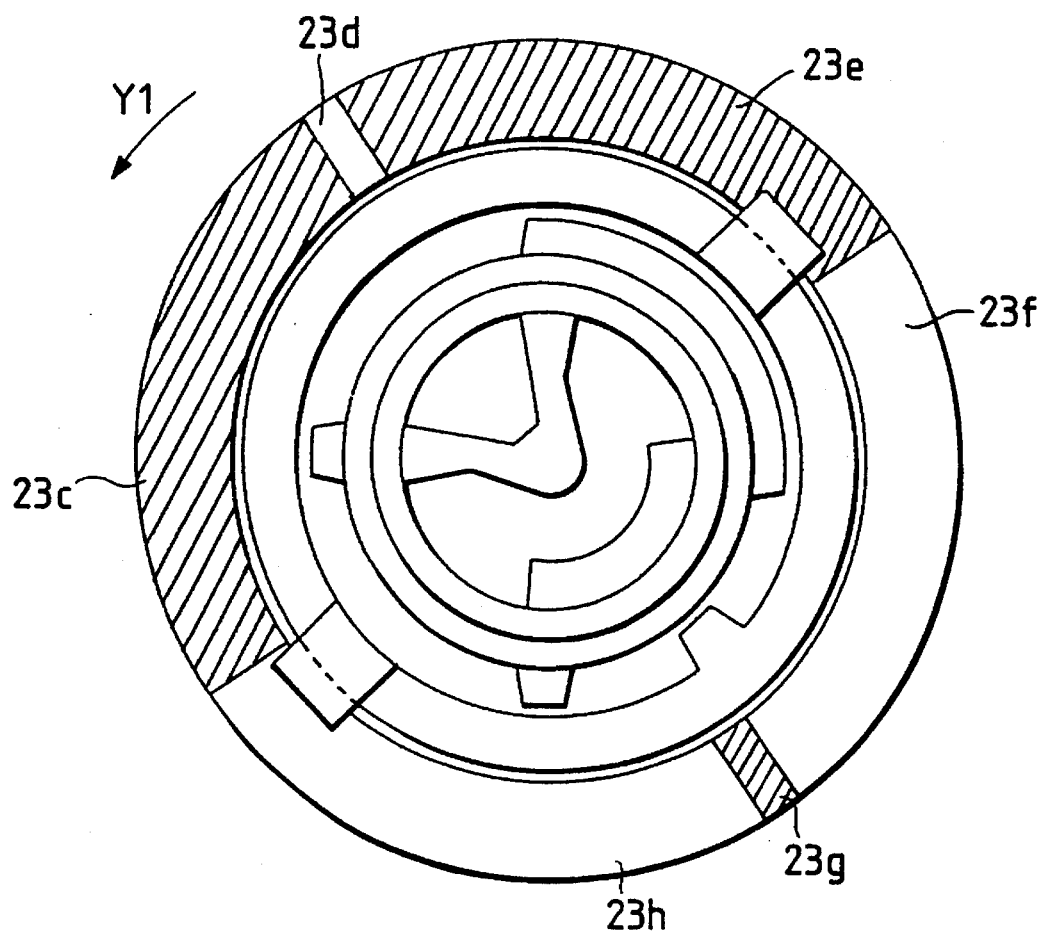
FIG. 16 illustrates a fastening surface portion 23 of the patrone according to third and fourth embodiments.

The patrone 10 according to this embodiment is different from the patrone 10 according to the first embodiment in only the surface portion 23. As shown in FIG. 16, the surface portion 23 comprises inclined surfaces 23c and 23e, which are substantially the half of the circumference, a narrow-width non-inclined surface 23d disposed at the central portion between the above-described two inclined surfaces 23c and 23e, non-inclined surfaces 23f and 23h which are disposed on the side opposing the above-described surfaces and which are substantially the half of the circumference, and a narrow-width inclined surface 23g disposed at the central portion between the above-described non-inclined surfaces 23f and 23h. In accordance with the position at which the spool 11 is stopped, the above-described surfaces selectively appear from the window portions 24a and 24b as follows:

| State | Window portion 24a | Window portion 24b |
| --- | --- | --- |
| "1" | inclined surface 23c | inclined surface 23e |
| "2" | inclined surface 23e | non-inclined surface 23f |
| "3" | non-inclined surface 23f | non-inclined surface 23h |

III-2: Structure of Cameras 40A and 40B

Figure 17:
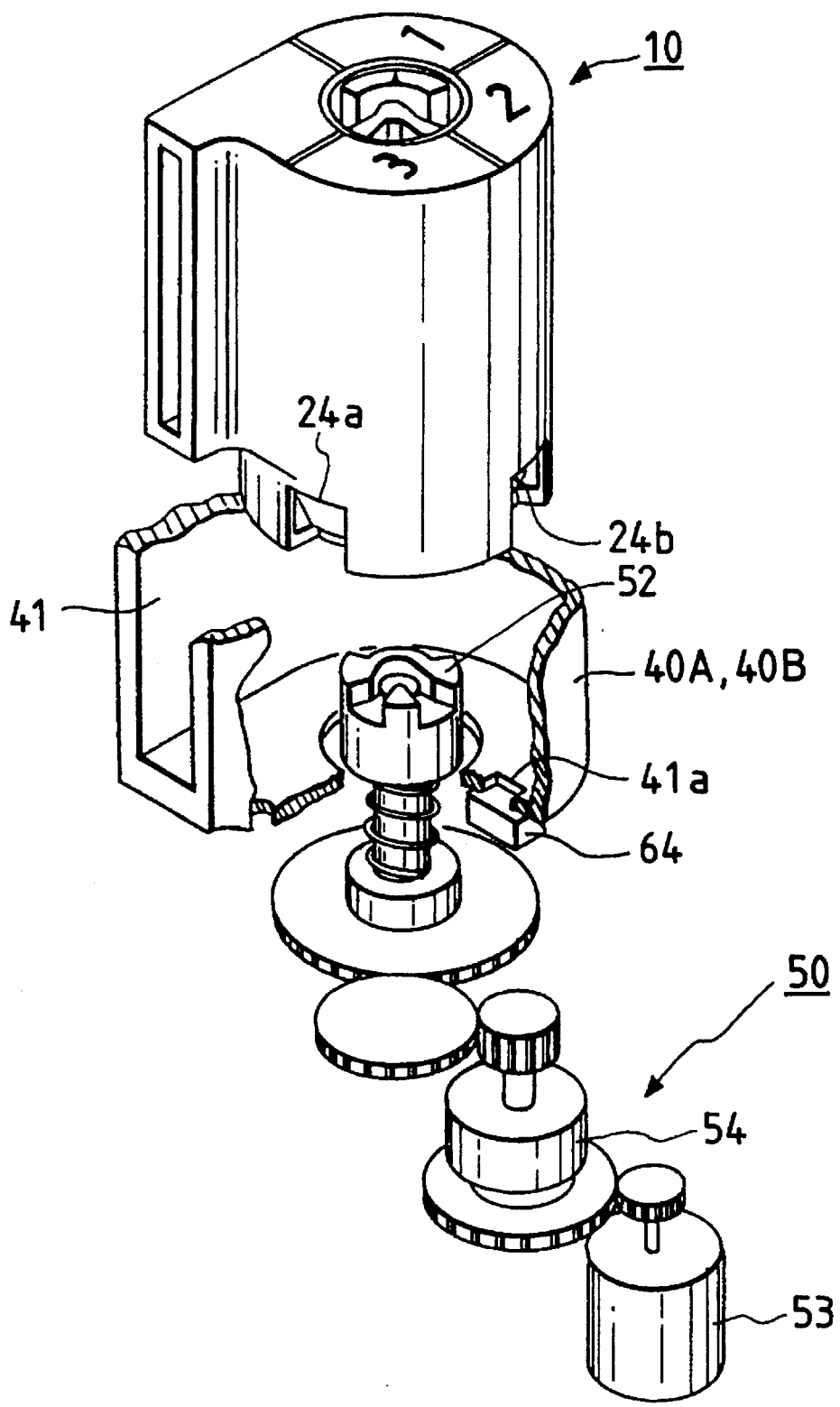
FIG. 17 is a perspective view which illustrates the patrone and the bottom portion of the patrone chamber of the camera according to the third embodiment.

The structure is arranged as shown in FIG. 17 where the same elements as those according to the first embodiment are given the same reference numerals and their descriptions are omitted here.

Figure 18A:
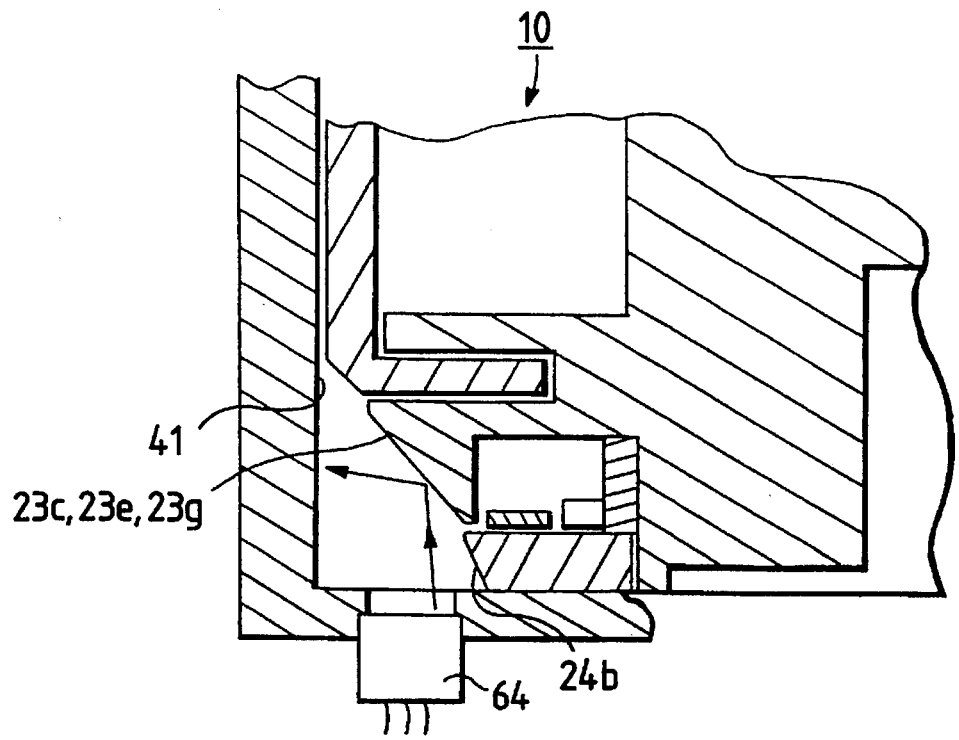
FIGS. 18A and 18B illustrate the operation of a photo-sensor 64.
Figure 18B:
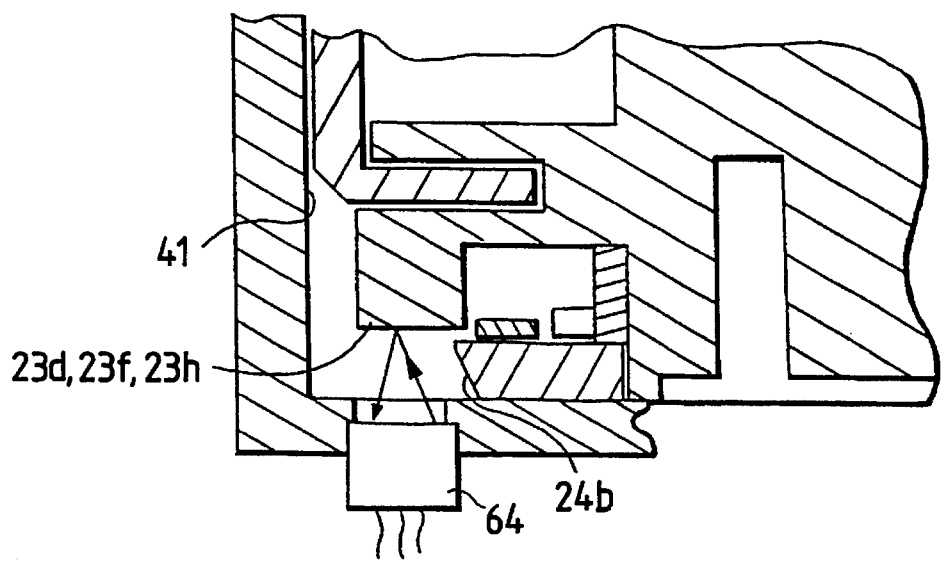

Reference numeral 64 represents a reflecting type photo-sensor disposed in the bottom portion of the patrone chamber 41, the photo-sensor 64 being disposed below an opening 41a formed at a position corresponding to the window portion 24b when the patrone 10 has been loaded. As shown in FIG. 18A, the photo-sensor 64 does not receive emitted light when the inclined surface 23c, 23e or 23g appears from the window portion 24b so that it outputs a low level signal. As shown in FIG. 18B, when the non-inclined surface 23d, 23f or 23h appears from the window portion 24b, the photo sensor receives the emitted light so that it outputs a high level signal. Similarly to the structure of the first embodiment shown in FIG. 11, the camera 40A further has the loading inhibiting pin 44 urged by the spring 44a and projecting on the inner surface of the patrone chamber 41, specifically, on the inner surface which corresponds to the portion at which the window portion 24a passes at the time of loading the patrone 10. On the other hand, similarly to the above-made description, also the camera 40B has the loading inhibiting pin 45 urged by the spring 45a and projecting on the inner surface which corresponds to the portion at which the window portion 24b passes at the time of loading the patrone 10. The function of each of the above-described loading inhibiting pins 44 and 45 is the same as that according to the first embodiment.

Figure 19:
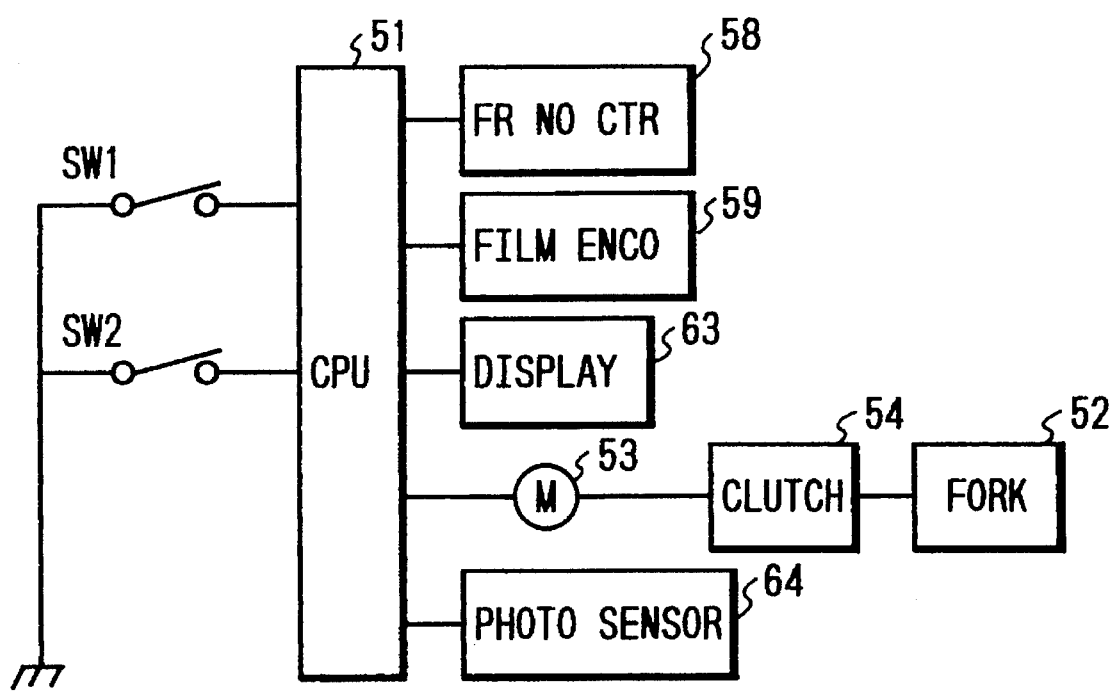
FIG. 19 is a block diagram for the camera according to the third embodiment.

FIG. 19 is a block diagram which corresponds to FIG. 10 which illustrates the first embodiment, and the same elements are given the same reference numerals and their descriptions are omitted. Reference numeral 64 represents the above-described photo-sensor.

III-3: Operation of Camera 40A

First, a control of rotation/stop of the spool 11 at the time of rewinding a film will be described.

Figure 20:
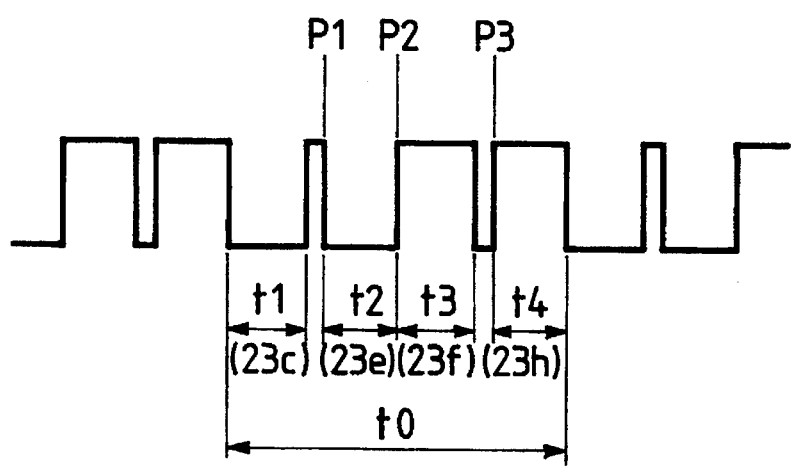
FIG. 20 illustrates an output signal from the photo-sensor 64.

At the time of the film rewinding, the spool 11 and the surface portion 23 which is in synchronization with the spool 11 are rotated in direction Y1 shown in FIG. 16, where the position of the window portion 24b is illustrated in the upper portion of the drawing. In synchronization with the rotation of the surface portion 23, the photo-sensor 64 transmits a signal as shown in FIG. 20. Symbol t0 denotes one period which corresponds to one rotation of the surface portion 23. Symbols t1, t2, t3 and t4 correspond to the moments at which the inclined surfaces 23c, 23e, non-inclined surfaces 23f and 23h are respectively detected by the photo-sensor 64. Therefore, by stopping the spool 11 by the control unit 51 after the last transition of P1 has been detected, it stops at the position at which the inclined surface 23e confronts the window portion 24b. Furthermore, by stopping the spool 11 after the first transition of each of P2 and P3 has been detected, it stops at a position at which the non-inclined surface 23f or 23h confronts the window portion 24b. The above-described states of stoppage correspond to the displayed state of "1", "2" and "3", respectively. The above-described detections of the first and last transition in one period t0 can be made in accordance with a known technology and therefore its description is omitted here. The control of rotation/stop of the spool 11 is performed in accordance with the procedure according to the first embodiment shown in FIG. 13.

The operation at the time of loading the patrone 10 will now be described.

When the patrone 10 in the display state "1" or "2" is loaded, either the inclined surface 23c or 23e appears from the window portion 24a. Therefore, the loading inhibiting pin 44 is retracted and thereby the loading is allowed. When the patrone 10 is loaded in the patrone chamber 41, the display state "1" or "2" is detected. In the case of "1", the inclined surface 23e appears from the window portion 24b, while the non-inclined surface 23f appears in the case of "2". By utilizing the above-described facts, a determination is made. That is, the signal from the photo-sensor 64 is examined to determine the state is "1" if the level of the above-described signal is low and determine the state is "2" if the same is high.

When the patrone 10 in the state "3" is loaded, the non-inclined surface 23f appears from the window portion 24a and it is interfered with by the loading inhibiting pin 44. Therefore, the loading is mechanically inhibited.

III-4: Operation in Camera 40B

The control of the rotation/stop of the spool 11 at the time of rewinding the film after it has been photographed is the same as that performed in the camera 40A except for the fact that the spool 11 is not controlled to the position "2". In a case where it is controlled to the state "1", the spool 11 is stopped after the last transition of P1 shown in FIG. 20 has been detected. In a case where it is controlled to the state "3", the spool 11 is stopped after the first transition of P3 has been detected.

The operation performed at the time of loading the patrone 10 will now be described.

When the patrone 10 in the display state "1" is loaded, the inclined surface 23e appears from the window portion 24b. Therefore, the loading inhibiting pin 45 is retracted and thereby the loading is allowed. When the patrone 10 in the state "2" or "3" is loaded, either the non-inclined surface 23f or 23h appears from the window portion 24b and it is interfered with by the loading inhibiting pin 45. As a result, the loading is mechanically inhibited.

(IV) Fourth Embodiment

According to the third embodiment, loading of the patrone 10 (the patrone 10 stopped at the position "3" for the camera 40A and the patrone 10 stopped at the position "2" or "3" for the camera 40B) in a state where it cannot be used in the subject camera is mechanically inhibited. However, in a case where it is difficult to place the loading inhibiting pins 44 and 45 in the patrone chamber 41 due to the spatial limit, a structure according to a fourth embodiment may be employed. According to this embodiment, the state of the patrone is determined after it has been loaded. Then, if it cannot be used in the camera, a display and warning are made so as to inhibit the ensuing photographing operation. The fourth embodiment is arranged to use the patrone 10 which is the same as that according to the third embodiment and the camera is modified.

IV-1: Structure of Cameras 40A and 40B

Figure 21:
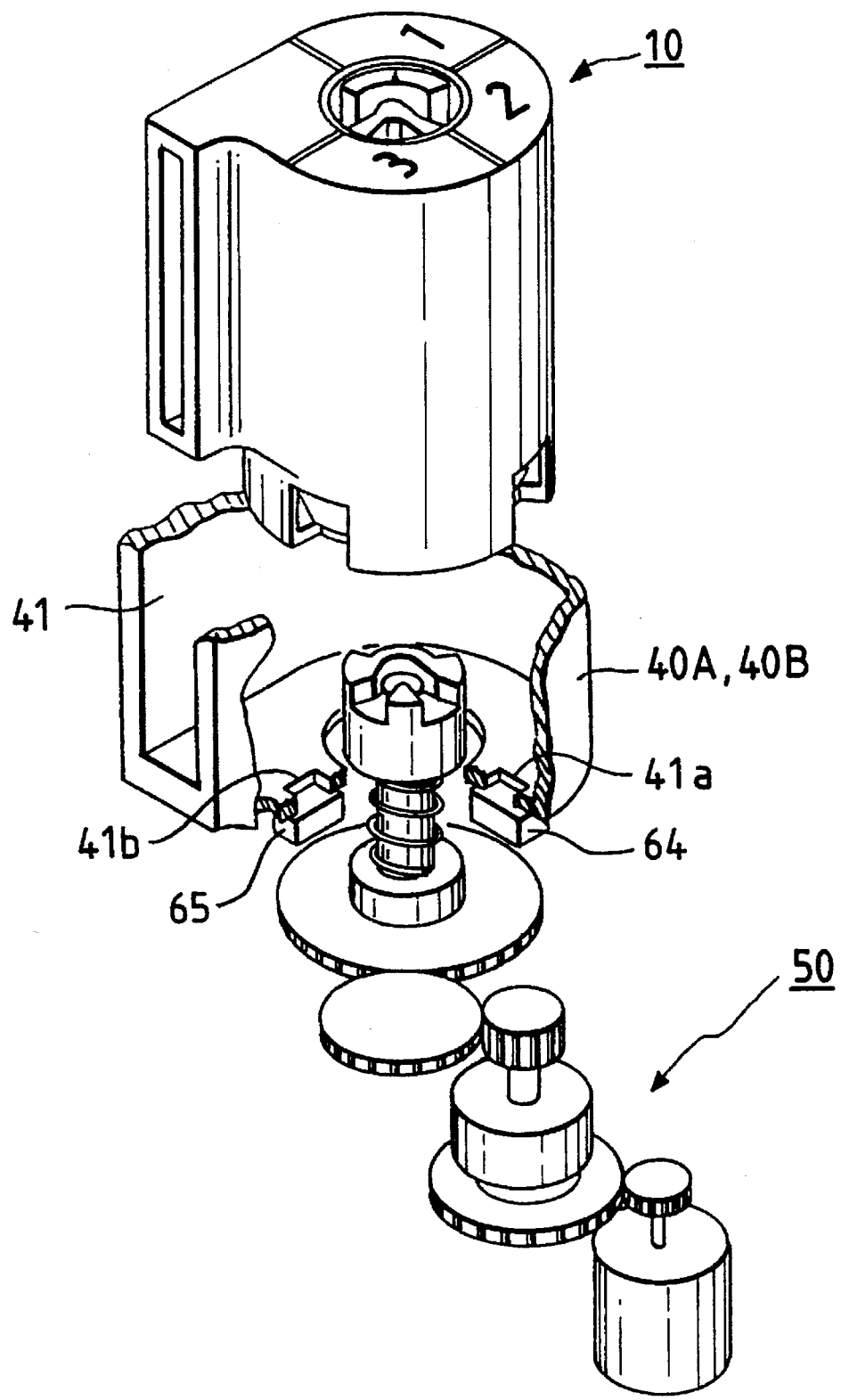
FIG. 21 is a perspective view which illustrates the patrone and the bottom portion of the patrone chamber of the camera according to the fourth embodiment.

As shown in FIG. 21, each of the cameras 40A and 40B comprises a photo-sensor 64 arranged similarly to that according to the third embodiment and a second reflecting type photo-sensor 65 disposed below an opening 41b formed at a position corresponding to the window portion 24a at the time of loading the patrone 10 into the patrone chamber 41. The loading inhibiting pins 44 and 45 employed in the structure according to the third embodiment are omitted.

IV-2: Operation in the Camera 40A or 40B

The control of rotation/stop of the spool 11 at the time of rewinding the film which has been photographed is, similarly to the third embodiment, performed in response to the signal transmitted from the photo-sensor 64. As will be apparent, the control may also be performed in response to the signal transmitted from the photo-sensor 65 using appropriate detection of portions of the signal shown in FIG. 20. Furthermore, the stop position may be controlled by using the signals from both the photo-sensors 64 and 65 (by specifying the spool position in accordance with the following method of signal combination). In this case, surfaces 23d and 23g are not used.

As for the operation at the time of loading the patrone 10, the patrone 10 in any state "1", "2" and "3" can be loaded since the loading inhibiting pins 44 and 45 are not provided.

Since the surface portion 23 appears from the window portions 24a or 24b when the patrone 10 has been loaded into the patrone chamber 41 similarly to the third embodiment, the state can be detected from the combination of the signals from the photo-sensors 64 and 65, that is, the following determinations can be made:

photo-sensor 64: L photo-sensor 65: L→"1"

photo-sensor 64: H photo-sensor 65: L→"2"

photo-sensor 64: H photo-sensor 65: H→"3"

Since the process to be performed after the state of the patrone 10 has been determined may be performed similarly to that described with reference to FIG. 15 according to the second embodiment, its detailed description is omitted here.

Figure 22A:
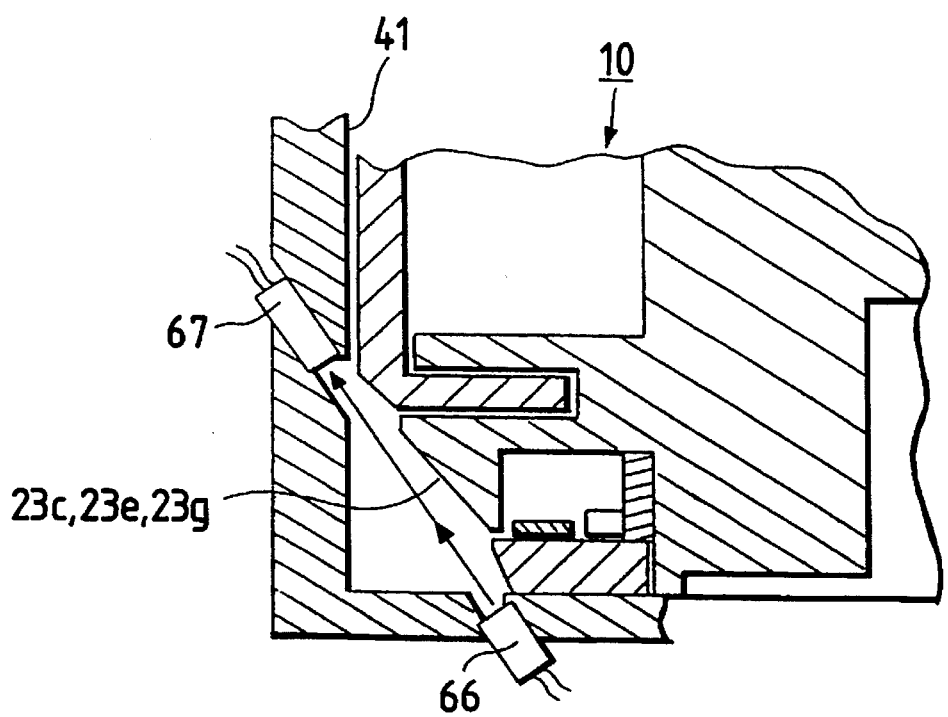
FIGS. 22A and 22B illustrate modifications of the photo-sensor.
Figure 22B:
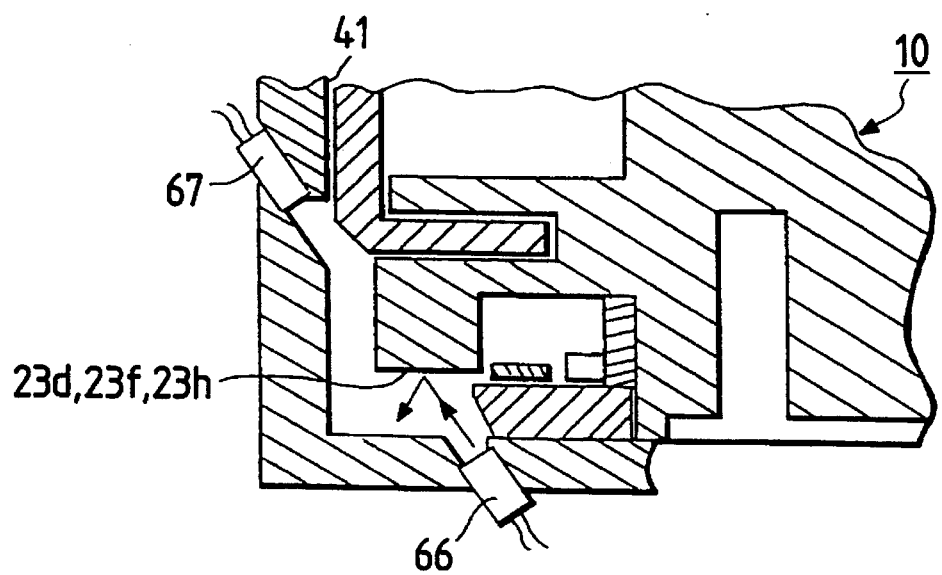

According to the third and fourth embodiments, the reflecting type photo-sensor is, as the device for detecting the surface portion 23, disposed in the bottom portion of the patrone chamber 41. It may be disposed in the side portion which corresponds to the window portions 24a and 24b. Furthermore, a structure may be employed which is, as shown in FIG. 22, arranged in such a manner that a pair composed of a light emitting device 66 and a light receiving device 67 are employed.

Furthermore, according to the third and fourth embodiments, the position of the spool 11 is detected in such a manner that the position of the surface portion 23 integrally disposed with the spool 11 is directly detected in place of indirectly detecting it from the position of the fork 52 by using the fork encoder 57. Therefore, the conventional necessity of arranging the structure in such a manner that there is only one way of establishing fastening between the fork 52 and the fastening portion 15 within 360° can be eliminated. A conventional 135-type spline may be employed.

Another method of detecting the position of the spool 11 for the purpose of controlling the rotation/stop of the spool 11 and discriminating the state of the loaded patrone 10 according to the fourth embodiment may be employed. That is, the overall surface of the surface portion 23 is formed by non-inclined surface and color of a high reflectance (for example, white) is printed in the portion corresponding to the inclined surface 23e, color of an intermediate reflectance (for example, gray) is printed in the portion corresponding to the non-inclined surface 23f and color of a low reflectance (for example, black) is printed in the portion corresponding to the non-inclined surface 23h so as to be identified by the photo-sensor 64 disposed at a position corresponding to the window portion 24b.

According to the embodiments of the present invention, the rotation/stop of the spool 11 is controlled and the state of the loaded patrone 10 is discriminated by the fork encoder 57 in the first and second embodiments. The photosensors 64 and 65 are employed in the third and fourth embodiments. However, the present invention is not limited to the above-described structures. It may be realized by a combination of the fork encoder and a photo-sensor in such a manner, for example, that a fork encoder is used as the device for controlling the rotation/stop of the spool 11 and a photo-sensor is used as the device for discriminating the state of the loaded patrone 10. Another structure may be employed which is arranged by reversing the above-described combination.

Although the invention has been described in its preferred form with a certain degree of particularly, it is apparent that various changes and modifications may be made in keeping with the broader principles of the invention, as hereinafter claimed.

I claim:

1. A camera capable of loading a film magazine which has a spool capable of being rotated to wind and feed a film and indicating means independent of said film having a first position indicative of an unexposed condition of said film and a second position indicative of an exposed condition of said film, comprising:

a magazine chamber in which said film magazine is loadable regardless of which of said positions said indicating means is disposed in;

detecting means for detecting the position of said indicating means of said film magazine loaded in said magazine chamber; and control means responsive to said detecting means for controlling a photographing operation, said control means inhibiting the photographing operation when said detecting means detects that said indicating means is at said second position.

2. A camera according to claim 1, wherein said control means permits the photographing operation when said detecting means detects that said indicating means is at said first position.

3. A camera capable of loading a film magazine which has a spool capable of being rotated to wind and feed a film and indicating means independent of said film having a first position indicative of an unused condition of said film, a second position indicative of a partially used condition of said film and a third position indicative of a fully used condition of said film, comprising:

a magazine chamber in which said film magazine is loadable regardless of which of said positions said indicating means is disposed in;

detecting means for detecting the position of said indicating means of said film magazine loaded in said magazine chamber; and control means responsive to said detecting means for controlling a photographing operation, said control means inhibiting the photographing operation when said detecting means detects that said indicating means is at said second position and when said detecting means detects that said indicating means is at said third position.

4. A camera according to claim 3, wherein said control means permits the photographing operation when said detecting means detects that said indicating means is at said first position.

5. A camera capable of loading a film magazine which has a spool capable of being rotated to wind and feed a film and indicating means independent of said film having a first position indicative of an unused condition of said film, a second position indicative of a partially used condition of said film and a third position indicative of a fully used condition of said film, comprising:

a magazine chamber in which said film magazine is loadable regardless of which of said positions said indicating means is disposed in;

detecting means for detecting the position of said indicating means of said film magazine loaded in said magazine chamber; and control means responsive to said detecting means for controlling said camera, said control means performing a first controlling operation when said detecting means detects that said indicating means is at said first position, said control means performing a second controlling operation when said detecting means detects that said indicating means is at said second position.

6. A camera according to claim 5, wherein said control means inhibits a photographing operation when said detecting means detects that said indicating means is at said third position.

7. A camera system comprising:

a film magazine having a spool capable of being rotated to wind and feed a film and indicating means independent of said film and fixed to said spool so as to be rotatable by said spool, said indicating means having a first position indicative of an unexposed condition of said film and a second position indicative of an exposed condition of said film; and a camera having a magazine chamber in which said film magazine is loadable regardless of which of said positions said indicating means is disposed in, detecting means for detecting the position of said indicating means of said film magazine loaded in said magazine chamber, and control means responsive to said detecting means for controlling a photographing operation, said control means inhibiting the photographing operation when said detecting means detects that said indicating means is at said second position.

8. A camera system according to claim 7, wherein said control means permits the photographing operation when said detecting means detects that said indicating means is at said first position.

9. A camera system comprising:

a film magazine having a spool capable of being rotated to wind and feed a film and indicating means independent of said film and fixed to said spool so as to be rotatable by said spool, said indicating means having a first position indicative of an unused condition of said film, a second position indicative of a partially used condition of said film, and a third position indicative of a fully used condition of said film; and a camera having a magazine chamber in which said film magazine is loadable regardless of which of said positions said indicating means is disposed in, detecting means for detecting the position of said indicating means when said film magazine has been loaded in said magazine chamber, and control means responsive to said detecting means for controlling the camera based on the detected position of said indicating means.

10. A camera system according to claim 9, wherein said control means inhibits a photographing operation of the camera when said detecting means detects that said indicating means is at said second position and when said detecting means detects that said indicating means is at said third position.

11. A camera system according to claim 10, wherein said control means permits the photographing operation when said detecting means detects that said indicating means is at said first position.

12. A camera system according to claim 9, wherein said control means performs a first controlling operation when said detecting means detects that said indicating means is at said first position and a second controlling operation when said detecting means detects that said indicating means is at said second position.

13. A camera system according to claim 12, wherein said control means inhibits a photographing operation of the camera when said detecting means detects that said indicating means is at said third position.

14. A camera capable of loading a film magazine which has a spool capable of being rotated to wind and feed a film and an indicator independent of said film having a first position indicative of an unexposed condition of said film and a second position indicative of an exposed condition of said film, comprising:

a magazine chamber in which said film magazine is loadable regardless of which of said positions said indicator is disposed in;

a detecting device which detects the position of said indicator of said film magazine loaded in said magazine chamber; and a controller responsive to said detecting device and which controls a photographing operation, said controller inhibiting the photographing operation when said detecting device detects that said indicator is at said second position.

15. A camera capable of loading a film magazine which has a spool capable of being rotated to wind and feed a film and an indicator independent of said film having a first position indicative of an unused condition of said film, a second position indicative of a partially used condition of said film and a third position indicative of a fully used condition of said film, comprising:

a magazine chamber in which said film magazine is loadable regardless of which of said positions said indicator is disposed in;

a detecting device which detects the position of said indicator of said film magazine loaded in said magazine chamber; and a controller responsive to said detecting device and which controls a photographing operation, said controller inhibiting the photographing operation when said detecting device detects that said indicator is at said second position and when said detecting device detects that said indicator is at said third position.

16. A camera capable of loading a film magazine which has a spool capable of being rotated to wind and feed a film and an indicator independent of said film having a first position indicative of an unused condition of said film, a second position indicative of a partially used condition of said film and a third position indicative of a fully used condition of said film, comprising:

a magazine chamber in which said film magazine is loadable regardless of which of said positions said indicator is disposed in;

a detecting device which detects the position of said indicator of said film magazine loaded in said magazine chamber; and a controller responsive to said detecting device and which controls said camera, said controller performing a first controlling operation when said detecting device detects that said indicator is at said first position, said controller performing a second controlling operation when said detecting device detects that said indicator is at said second position.

17. A camera system comprising:

a film magazine having a spool capable of being rotated to wind and feed a film and an indicator independent of said film and fixed to said spool so as to be rotatable by said spool, said indicator having a first position indicative of an unexposed condition of said film and a second position indicative of an exposed condition of said film; and a camera having a magazine chamber in which said film magazine is loadable regardless of which of said positions said indicator is disposed in, a detecting device which detects the position of said indicator of said film magazine loaded in said magazine chamber, and a controller responsive to said detecting device and which controls a photographing operation, said controller inhibiting the photographing operation when said detecting device detects that said indicator is at said second position.

18. A camera system comprising:

a film magazine having a spool capable of being rotated to wind and feed a film and an indicator independent of said film and fixed to said spool so as to be rotatable by said spool, said indicator having a first position indicative of an unused condition of said film, a second position indicative of a partially used condition of said film, and a third position indicative of a fully used condition of said film; and a camera having a magazine chamber in which said film magazine is loadable regardless of which of said positions said indicator is disposed in, a detecting device which detects the position of said indicator when said film magazine has been loaded in said magazine chamber, and a controller responsive to said detecting device and which controls the camera based on the detected position of said indicator.

* * * * *